(12) United States Patent
Ikeda et al.

(10) Patent No.: US 9,441,554 B2
(45) Date of Patent: Sep. 13, 2016

(54) CONTROL SYSTEM FOR INTERNAL COMBUSTION ENGINE

(75) Inventors: Tomoki Ikeda, Wako (JP); Naoki Oie, Wako (JP); Toshiaki Ichouda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 13/984,866

(22) PCT Filed: Feb. 7, 2012

(86) PCT No.: PCT/JP2012/052654
§ 371 (c)(1),
(2), (4) Date: Aug. 12, 2013

(87) PCT Pub. No.: WO2012/132554
PCT Pub. Date: Oct. 4, 2012

(65) Prior Publication Data
US 2013/0325289 A1    Dec. 5, 2013

(30) Foreign Application Priority Data

Mar. 28, 2011 (JP) ................................ 2011-069995

(51) Int. Cl.
*F02D 28/00* (2006.01)
*F02D 29/02* (2006.01)
(Continued)

(52) U.S. Cl.
CPC ............... *F02D 28/00* (2013.01); *F02D 29/02* (2013.01); *F02D 41/10* (2013.01);
(Continued)

(58) Field of Classification Search
CPC ........ F02D 45/08; F02D 41/10; F02D 41/12; F02D 41/14; F02D 41/1498; F02D 2250/18; F02D 11/105; F02D 2041/141; F02D 2041/288; F02D 2200/1004; F02D 2250/21; F02D 2250/28; F02D 35/028; F02D 28/00; F02D 29/02; F02D 41/1401; F02D 41/1497; F02D 41/0225; F02D 41/123; F02D 41/18; F02D 41/40; F02D 2041/1422; F02D 2200/1012; F02D 2200/602; F02P 5/1504; Y02T 10/46

USPC ................... 123/406.24, 436, 192.1, 406.46, 123/406.51; 701/102, 111, 54; 702/41

See application file for complete search history.

(56) References Cited

U.S. PATENT DOCUMENTS 4,357,662 A * 11/1982 Schira ................ F02D 41/1498
                                                      123/406.24

(Continued)

FOREIGN PATENT DOCUMENTS

DE    38 31 575 A1    4/1989
DE    40 09 791 A1    10/1991
(Continued)

OTHER PUBLICATIONS

European Search Report dated Jul. 23, 2014, for corresponding European Patent Application No. 12764570.3.
(Continued)

*Primary Examiner* — Hung Q Nguyen
*Assistant Examiner* — John Bailey
(74) *Attorney, Agent, or Firm* — Squire Patton Boggs (US) LLP

(57) ABSTRACT

A control system for an internal combustion engine, which controls an output torque of the internal combustion engine for driving a vehicle, is provided. An engine rotational speed is detected, and a change amount of the detected engine rotational speed is calculated. The output torque control amount of the engine is corrected so that the rotational speed change amount coincides with the center value of the local minimum value and the local maximum value of the rotational speed change amount. Specifically, a torque correction amount is calculated according to a torque value which is equal to half of a difference between peak vibration torque values corresponding to the local minimum value and the local maximum value of the rotational speed change amount, and an output torque control amount is corrected with the torque correction amount.

12 Claims, 13 Drawing Sheets

(51) Int. Cl.
   *F02D 41/10*   (2006.01)
   *F02D 41/14*   (2006.01)
   *F02P 5/15*    (2006.01)
   *F02D 41/02*   (2006.01)
   *F02D 41/12*   (2006.01)
   *F02D 41/18*   (2006.01)
   *F02D 41/40*   (2006.01)

(52) U.S. Cl.
   CPC ..... *F02D 41/1401* (2013.01); *F02D 41/1497* (2013.01); *F02P 5/1504* (2013.01); *F02D 41/0225* (2013.01); *F02D 41/123* (2013.01); *F02D 41/18* (2013.01); *F02D 41/40* (2013.01); *F02D 2041/1422* (2013.01); *F02D 2200/1012* (2013.01); *F02D 2200/602* (2013.01); *F02D 2250/18* (2013.01); *F02D 2250/28* (2013.01); *Y02T 10/46* (2013.01)

(56) References Cited

U.S. PATENT DOCUMENTS

| | | | | |
|---|---|---|---|---|
| 4,919,098 A * | 4/1990 | Shimada | F02D 41/1498 | 123/406.46 |
| 4,928,652 A * | 5/1990 | Shinya | F02D 41/1498 | 123/406.19 |
| 5,278,760 A * | 1/1994 | Ribbens | F02D 41/1498 | 123/436 |
| 5,537,967 A * | 7/1996 | Tashiro | B60K 6/485 | 123/192.1 |
| 5,642,707 A * | 7/1997 | Cerf | F02D 31/005 | 123/339.23 |
| 5,755,206 A * | 5/1998 | Takahashi | F02D 35/021 | 123/406.37 |
| 6,955,155 B2 * | 10/2005 | Surnilla | F01N 3/2006 | 123/339.11 |
| 7,133,766 B2 * | 11/2006 | Kokubo | F02D 35/024 | 123/406.2 |
| 8,116,954 B2 * | 2/2012 | Livshiz | F02D 11/105 | 123/399 |
| 8,423,264 B2 * | 4/2013 | Itabashi | F02D 41/021 | 123/192.1 |
| 8,812,184 B2 * | 8/2014 | Hakumura | B60L 3/003 | 123/192.1 |
| 2004/0034460 A1 * | 2/2004 | Folkerts | B60W 30/188 | 701/54 |
| 2004/0084025 A1 * | 5/2004 | Zhu | F01N 3/2006 | 123/435 |
| 2004/0107034 A1 * | 6/2004 | Togai | B60K 26/04 | 701/54 |
| 2005/0171670 A1 * | 8/2005 | Yoshioka | B60W 10/06 | 701/54 |
| 2009/0118968 A1 * | 5/2009 | Livshiz | F02D 11/105 | 701/102 |
| 2009/0259382 A1 * | 10/2009 | McKay | F02D 41/0085 | 701/102 |
| 2010/0116247 A1 * | 5/2010 | Shikama | F02D 11/105 | 123/399 |
| 2010/0211287 A1 * | 8/2010 | Ohtsuka | F02D 41/00 | 701/102 |
| 2011/0118077 A1 * | 5/2011 | Kawasaki | B60K 6/445 | 477/3 |
| 2011/0264335 A1 * | 10/2011 | Zhao | B66F 9/22 | 701/50 |
| 2012/0265400 A1 * | 10/2012 | Oikawa | B60K 6/445 | 701/37 |
| 2013/0282259 A1 * | 10/2013 | Takahashi | F02D 11/105 | 701/103 |

FOREIGN PATENT DOCUMENTS

| | | |
|---|---|---|
| DE | 199 49 449 A1 | 5/2001 |
| JP | 01-193065 A | 8/1989 |
| JP | 02-245474 A | 10/1990 |
| JP | 03-294659 A | 12/1991 |
| JP | 7-083104 A | 3/1995 |
| JP | 2004-346915 A | 12/2004 |
| JP | 2008-286111 A | 11/2008 |
| JP | 2010-127105 A | 6/2010 |
| WO | 2010/121888 A1 | 10/2010 |

OTHER PUBLICATIONS

International Search Report dated Mar. 13, 2012 corresponding to International Patent Application No. PCT/JP2012/052654 and English translation thereof.

* cited by examiner

CONTROL SYSTEM FOR INTERNAL COMBUSTION ENGINE

TECHNICAL FIELD

The present invention relates to a control system for an internal combustion engine, and particularly to a control system which performs an engine output torque control for suppressing vibrations of the vehicle power train caused upon sudden change in the torque applied to the engine output shaft.

BACKGROUND ART

Patent Document 1 (shown below) shows a control system which performs the engine output torque control for suppressing vibrations of the vehicle power train caused upon sudden change in the torque applied to the engine output shaft. According to this system, a high-pass filtering of a detected engine rotational speed is performed and the engine output torque is corrected so that the high-pass filtered engine rotational speed becomes "0".

Patent Document 2 (shown below) shows a control system for an internal combustion engine having a dual-mass flywheel on the output shaft. According to this system, an engine output correction is performed so that the engine output change is suppressed according to an amplitude or a peak value of a change amount of the engine rotational speed when the dual-mass flywheel is in a resonance state.

PRIOR ART DOCUMENT

Patent Document

Patent Document 1: Japanese Patent Laid-open No. 2008-286111
Patent Document 2: Japanese Patent Laid-open No. 2010-127105

SUMMARY OF THE INVENTION

Problems to be Solved by the Invention

In the system of Patent Document 1, the engine output torque correction is performed so that the high-pass filtered engine rotational speed becomes "0", which raised the following problem depending on the designed characteristic of the high-pass filter. That is, when the accelerator pedal of the vehicle is depressed and the vehicle is in an accelerating condition, i.e., although the acceleration that the driver demands is performed, the engine acceleration including the driver demanded acceleration is suppressed, which invites the situation that the vehicle acceleration demanded by the driver may not be obtained.

Further, in the system of Patent Document 2, an engine output correction is performed according to the amplitude or the peak value of the engine rotation change amount. However, Patent Document 2 includes no detailed description regarding the method of the output correction, and the above-described problem cannot be solved.

The present invention was made contemplating the above-described point, and an objective of the present invention is to provide a control system for an internal combustion engine, which appropriately performs the engine output torque control to make it possible to suppress unpleasant vibrations with maintaining the engine output demanded by the driver.

Means for Solving the Problems

To attain the above objective, the present invention provides a control system for an internal combustion engine for driving a vehicle, which controls an output torque of the engine. The control system comprises engine rotational speed detecting means, rotational speed change amount calculating means, and torque control amount correcting means. The engine rotational speed detecting means detects a rotational speed (NE) of the engine. The rotational speed change amount calculating means calculates a change amount (DNERAD) of the engine rotational speed. The torque control amount correcting means corrects an output torque control amount (IGLOG) of the engine so that the rotational speed change amount (DNERAD) coincides with a center value of a local minimum value (DNEDGDRZ) and a local maximum value (DNEDGDR) of the rotational speed change amount (DNERAD).

With this configuration, the change amount of the detected engine rotational speed is calculated, and the output torque control amount of the engine is corrected so that the rotational speed change amount coincides with the center value of the local minimum value and the local maximum value of the rotational speed change amount. The center value of the rotational speed change amount corresponds to the acceleration component that the vehicle driver demands. Accordingly, by performing the torque correction using the center value as a target value, unpleasant vibrations can be suppressed with maintaining the engine output demanded by the driver.

Preferably, the torque control amount correcting means includes torque correction amount calculating means for calculating a torque correction amount (IGDGFBBS) according to a torque value which is equal to half of a difference between peak vibration torque values (TRQDGDR, TRQDGDRZ) corresponding to the local minimum value and the local maximum value of the rotational speed change amount, and corrects the output torque control amount (IGLOG) with the torque correction amount (IGDGFBBS).

With this configuration, the torque correction amount is calculated according to the torque value equal to half of the difference between the peak vibration torque values corresponding to the local minimum value and the local maximum value of the rotational speed change amount, and the output torque control amount is corrected with the torque correction amount. It is thereby possible to perform the torque correction in which the rotational speed change amount is made to coincide with the center value.

Preferably, the torque correction amount calculating means includes resonance period calculating means for calculating a resonance period (TSINNGR) of a power train of the vehicle, and changes the torque correction amount (IGDGFBBS) with a delay of a timing correction time period (TCR) given by the following equation:

Timing correction time period=$TRSN/4 - TCDLY$ where TRSN is the resonance period, and TCDLY is a delay time period from the time of changing the output torque control amount to the time the output torque actually changes.

With this configuration, the resonance period of the vehicle power train is calculated, and the timing correction time period is calculated by subtracting the control delay time period TCDLY from the time period equal to one fourth of the resonance period. Further, the torque correction amount is controlled to change with a delay of the timing correction time period from the time of change in the rotational speed change amount. The phase of resonance vibration of the vehicle power train is delayed by about 90 degrees from the phase of change in the rotational speed change amount. Accordingly, the resonance vibration can effectively be suppressed by changing the torque correction amount with the above-described phase.

Preferably, the torque correction amount calculating means includes amplitude calculating means and sinusoidal wave signal value calculating means. The amplitude calculating means calculates an amplitude (TRQDGGAIN) of the torque correction amount according to a difference of the peak vibration torques (TRQDGDR, TRQDGDRZ). The sinusoidal wave signal value calculating means calculates a sinusoidal wave signal value (TRQDGSINP, TRQDGSINN) which periodically changes with the resonance period. The torque correction amount calculating means calculates the torque correction amount (IGDGFBBS) using the sinusoidal wave signal value (TRQDGSINP, TRQDGSINN) and the amplitude (TRQDGGAIN).

With this configuration, the amplitude of the torque correction amount is calculated according to the difference between the peak vibration torques, and the sinusoidal wave signal value which changes with the resonance period is calculated. Further, the torque correction amount is calculated using the sinusoidal wave signal value and the amplitude. The engine output torque for eliminating the vibration torque is generated with an appropriate amplitude and an appropriate phase, to effectively suppress the resonance vibration.

Preferably, the sinusoidal wave signal value calculating means includes period modifying means for modifying the sinusoidal wave signal value (TRQDGSINP, TRQDGSINN) to "0" at the time the timing correction time period (TCR) has elapsed from the time the plus/minus sign of the rotational speed change amount (DNERAD) changes.

With this configuration, the sinusoidal wave signal value is modified to "0" at the time the timing correction time period has elapsed from the time of change in the plus/minus sign of the rotational speed change amount. The resonance period may sometimes take a value which slightly deviates from the designed center value, due to differences in the vehicle characteristic or due to aging. Modifying the "0" crossing timing of the sinusoidal wave signal value applied to calculating the torque correction amount, reduces influence of the deviation in the resonance period, which makes it possible to obtain good vibration damping effect.

MODE FOR CARRYING OUT THE INVENTION

Preferred embodiments of the present invention will now be described with reference to the drawings.

Figure 1:
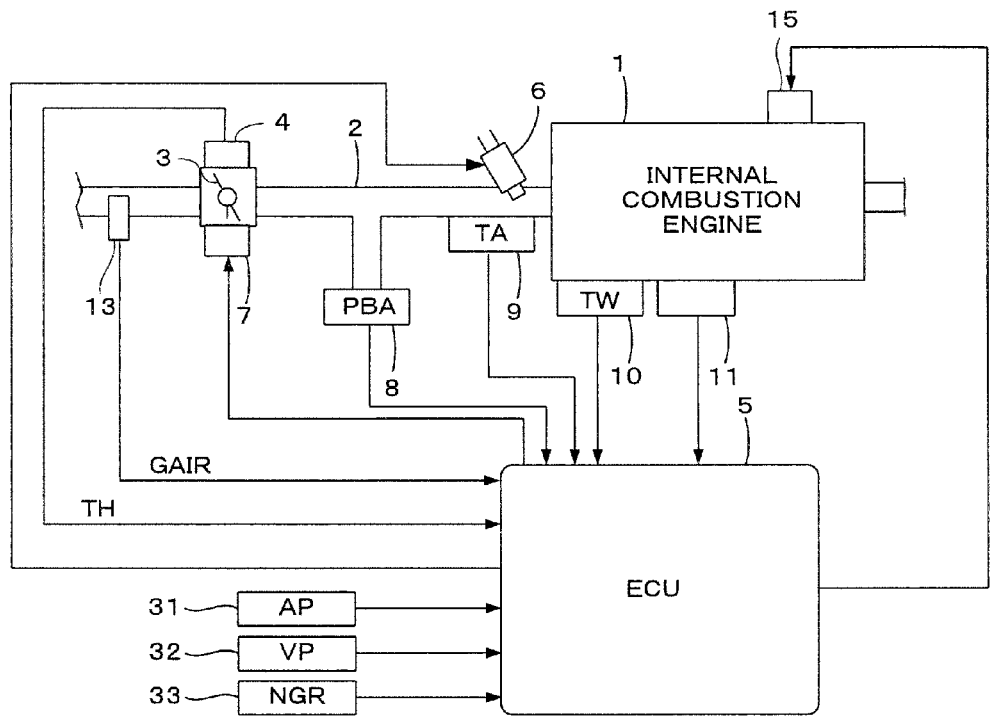
FIG. 1 shows a configuration of an internal combustion engine and a control system therefor according to one embodiment of the present invention.

FIG. 1 is a schematic diagram showing a configuration of an internal combustion engine and a control system therefor according to one embodiment of the present invention. In FIG. 1, the internal combustion engine 1 (hereinafter referred to as "engine") for example, has 4 cylinders, and has an intake pipe 2 provided with a throttle valve 3. A throttle valve opening sensor 4 is connected to the throttle valve 3, so as to output an electrical signal indicative of a throttle valve opening TH of the throttle valve 3 and supply the electrical signal to an electronic control unit (hereinafter referred to as "ECU") 5. An actuator 7 for actuating the throttle valve 3 is connected to the throttle valve 3, and the operation of the actuator 7 is controlled by the ECU 5.

An intake air flow rate sensor 13 for detecting an intake air flow rate GAIR of the engine 1 is disposed in the intake pipe 2. The detection signal of the intake air flow rate sensor 13 is supplied to the ECU 5.

Fuel injection valves 6 are inserted into the intake pipe 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5. A spark plug 15 is provided in each cylinder of the engine 1. Each spark plug 15 is connected to the ECU 5, and an ignition timing of each spark plug 15 is controlled by the ECU 5.

An intake pressure sensor 8 for detecting an intake pressure PBA and an intake air temperature sensor 9 for detecting an intake air temperature TA are disposed downstream of the throttle valve 3. An engine coolant temperature sensor 10 for detecting an engine coolant temperature TW is mounted on the body of the engine 1. The detection signals from these sensors are supplied to the ECU 5.

A crank angle position sensor 11 is connected to the ECU 5. The crank angle position sensor is provided to detect a rotational angle of the crankshaft (not shown) of the engine 1. A signal corresponding to the rotational angle of the crankshaft is supplied to the ECU 5. The crank angle position sensor 11 generates one pulse (hereinafter referred to as "CRK pulse") at every constant crank angle period (e.g., a period of 6 degrees). Further, the crank angle position sensor 11 generates a pulse at every predetermined crank angle position for a specific cylinder of the engine 1 (this pulse will be hereinafter referred to as "CYL pulse") and a pulse at the top dead center (TDC) starting the intake stroke in each cylinder (this pulse will be hereinafter referred to as "TDC pulse"). These pulses are used for control of various timings such as a fuel injection timing and an ignition timing, and for detection of an engine rotational speed NE.

An accelerator sensor 31, a vehicle speed sensor 32, and a shift position sensor 33 are also connected to the ECU 5. The accelerator sensor 31 detects a depression amount AP of an accelerator pedal of the vehicle driven by the engine 1 (this depression amount will be referred to as "accelerator operation amount"). The vehicle speed sensor 32 detects a running speed (vehicle speed) VP of the vehicle. The shift position sensor 33 detects a shift position (gear position) NGR of a manual transmission connected to the crankshaft (output shaft) of the engine 1. The detection signals from these sensors are supplied to the ECU 5.

The ECU 5 includes an input circuit, a central processing unit (hereinafter referred to as "CPU"), a memory circuit, and an output circuit. The input circuit performs various functions including shaping the waveforms of input signals from various sensors, correcting the voltage levels of the input signals to a predetermined level, and converting analog signal values into digital values. The memory circuit preliminarily stores various operating programs to be executed by the CPU and stores the results of computations or the like by the CPU. The output circuit supplies drive signals to the actuator 7, the fuel injection valve 6, and the spark plug 15.

The CPU in the ECU 5 performs a control of an opening of the throttle valve 3, a control of an amount of fuel to be supplied to the engine 1 (the opening period of each fuel injection valve 6), and a control of the ignition timing of each spark plug 15, according to the detected signals from the above-described sensors.

In this embodiment, the vibration damping control is performed by correcting the ignition timing so as to suppress vibrations caused by the resonance of the vehicle power train including the crankshaft of the engine 1, the transmission, the drive shaft, and the drive wheels.

Figure 2:
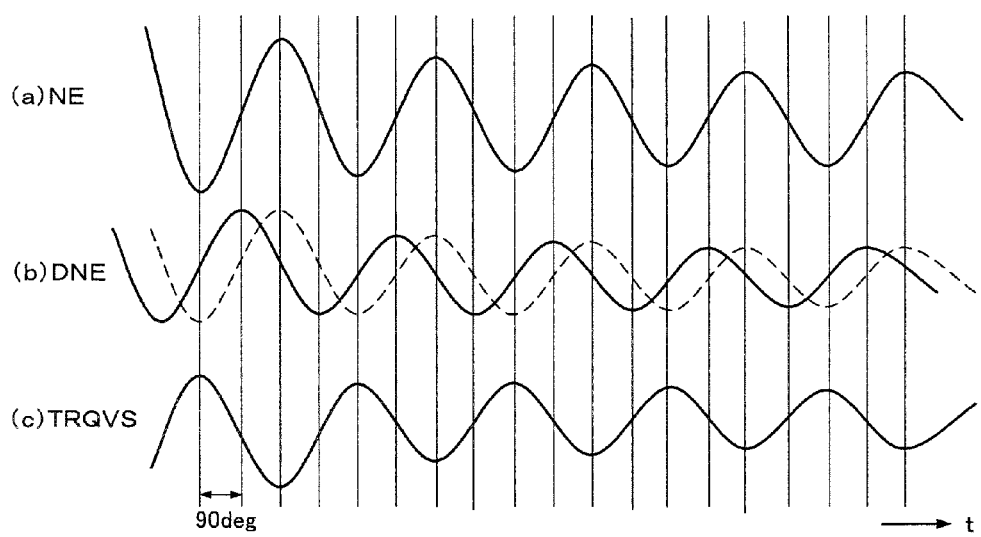
FIG. 2 shows time charts which illustrate a phase of the torque (vibration damping torque: TRQVS) for suppressing vibrations.

FIG. 2 shows time charts for explaining the outline of the vibration damping torque control, and shows changes in the engine rotational speed NE, a rotational speed change amount DNE corresponding to a first-order differential value of the engine rotational speed NE, and a vibration damping torque TRQVS upon occurrence of vibrations due to resonance of the vehicle power train. The dashed line shown in FIG. 2(b) indicates a waveform obtained by delaying the waveform phase of the rotational speed change amount DNE by 90 degrees (¼ period). The vibration damping torque TRQVS is generated so that the phase of TRQVS coincides with the phase obtained by reversing the ¼-period delayed waveform.

Figure 3:
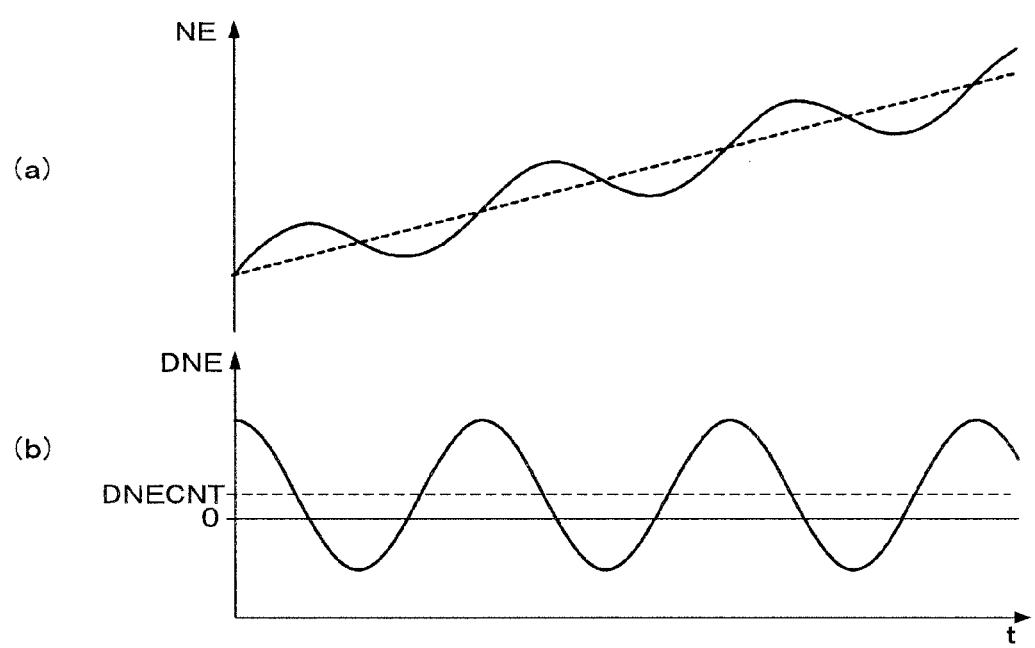
FIG. 3 shows time charts indicating changes in an engine rotational speed (NE) and a rotational speed change amount (DNE) upon acceleration.

FIG. 3 shows time charts of changes in the engine rotational speed NE and the rotational speed change amount DNE when a resonance vibration occurs upon engine acceleration (the accelerating rate is constant). As shown in FIG. 3, upon the engine acceleration, the center value DNECNT of the rotational speed change amount DNE becomes greater than "0". Accordingly, in this embodiment, the vibration damping torque control is performed to generate the vibration damping torque TRQVS so that the rotational speed change amount DNE coincides with the center value DNECNT. This control makes it possible to suppress unpleasant resonance vibrations with maintaining the output torque demanded by the driver.

Figure 4:
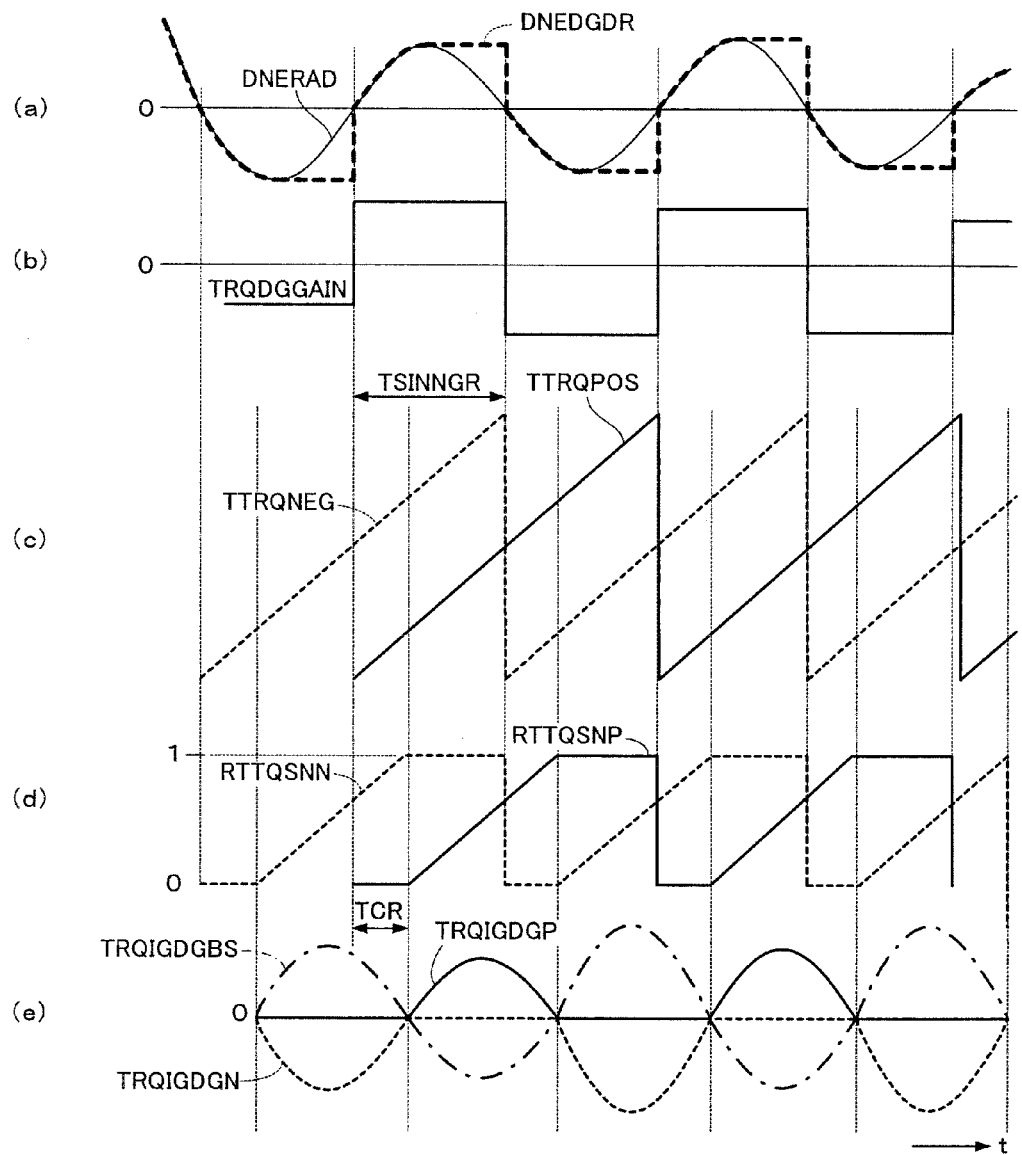
FIG. 4 shows time charts for illustrating an outline of the vibration damping torque control.

In this embodiment, the vibration damping torque TRQVS is generated by correcting the ignition timing. The vibration damping torque for calculating the ignition timing correction amount will be hereinafter referred to as "vibration damping torque TRQIGDGBS". The calculating method of the vibration damping torque TRQIGDGBS is described below with reference to FIG. 4.

FIG. 4(a) shows changes (the thin solid line) in an angular speed change rate DNERAD which is obtained by changing the dimension of the rotational speed change amount DNE to [rad/s$^2$], and changes (the thick dashed line) in a parameter for obtaining the local maximum value and the local minimum value (peak values) of the angular speed change rate DNERAD (the parameter is hereinafter referred to as "envelope parameter DNEDGDR"). A gain parameter TRQDGGAIN corresponding to the amplitude of the vibration damping torque TRQIGDGBS is calculated using the peak values of the envelope parameter DNEDGDR (FIG. 4(b)).

A first basic time period parameter TTRQPOS and a second basic time period parameter TTRQNEG are calculated and used as a reference time period for generating the vibration damping torque TRQIGDGBS (FIG. 4(c)). The first basic time period parameter TTRQPOS is reset at the time the angular speed change rate DNERAD changes from a negative value to a positive value. The second basic time period parameter TTRQNEG is reset at the time the angular speed change rate DNERAD changes from a positive value to a negative value.

Further, a half-resonance period TSINNGR corresponding to half of the resonance period of the vehicles power train is calculated according to the shift position NGR of the transmission, since the resonance period changes mainly depending on the shift position NGR. Further, a normalized time period parameters RTTQSNP and RTTQSNN are calculated using the half-resonance period TSINNGR, a timing correction time period TCR, and basic time period parameters TTRQPOS and TTRQNEG (FIG. 4(d)). The timing correction time period TCR is calculated by subtracting a control delay time period TCDLY from a time period (TSINNGR/2) corresponding to one fourth of the resonance period.

Vibration torques TRQIGDGP and TRQIGDGN corresponding to half cycle of a sinusoidal wave are calculated using the normalized time period parameters RTTQSNP and RTTQSNN, and the gain parameter TRQDGGAIN. The vibration damping torque TRQIGDGBS is calculated by reversing the phase (plus/minus sign) of the vibration torques and adding the phase-reversed vibration torques (FIG. 4 (e)).

Figure 5:
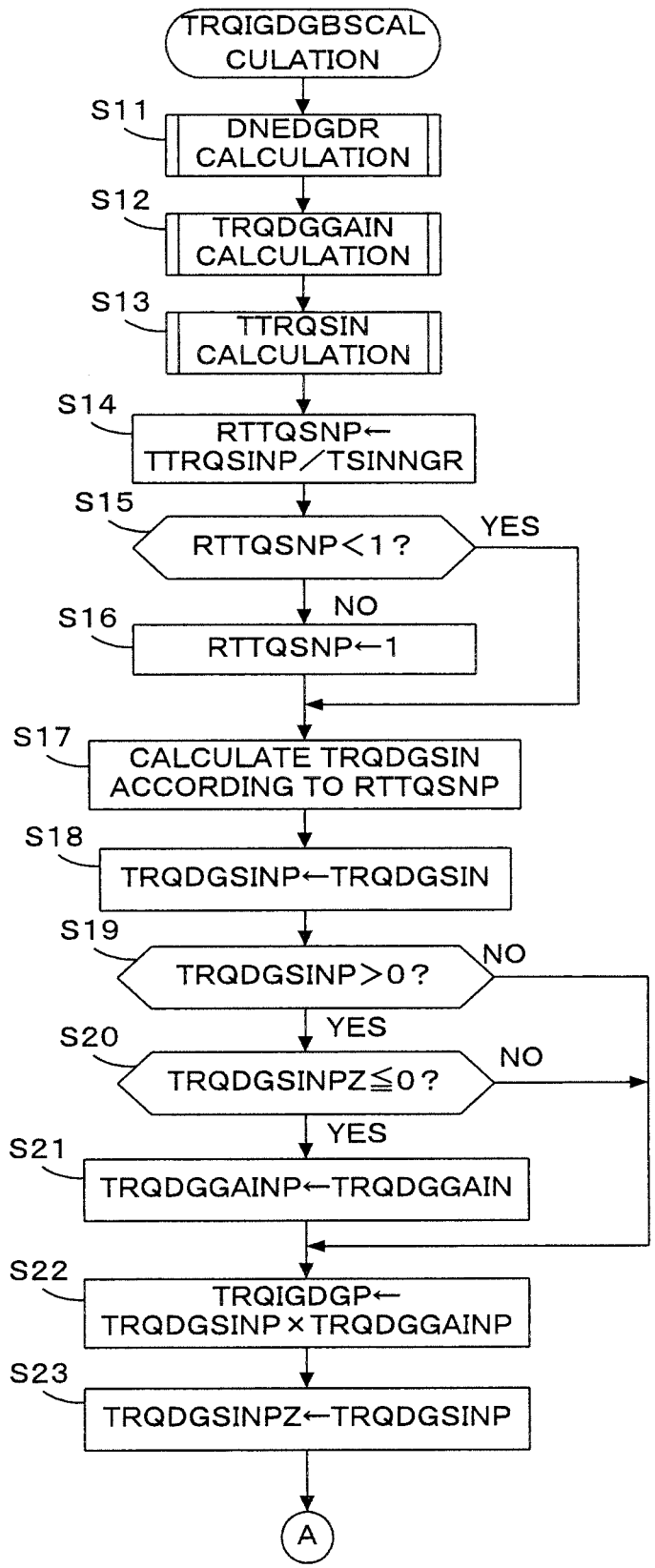
FIG. 5 shows a flowchart of a process for calculating a vibration damping torque (TRQIGFGBS).
Figure 6:
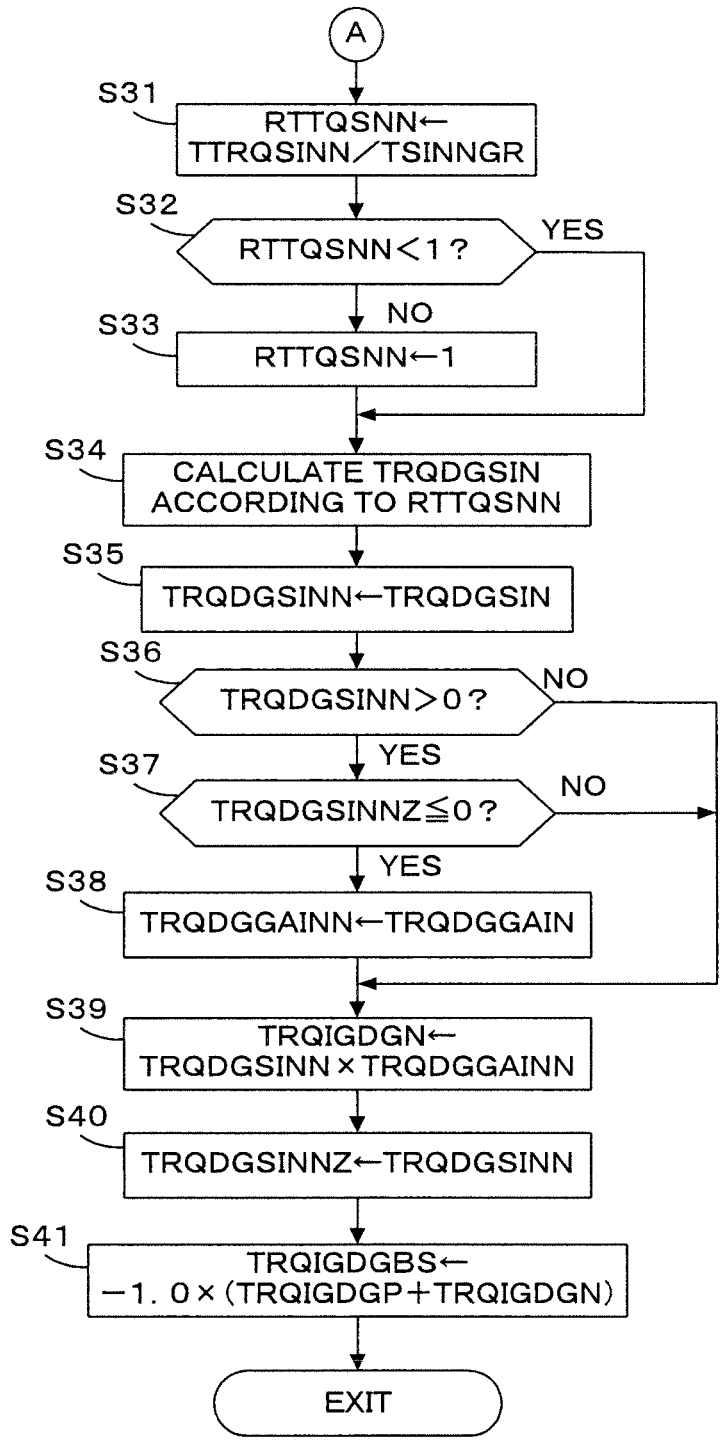
FIG. 6 shows a flowchart of the process for calculating the vibration damping torque (TRQIGFGBS).

FIGS. 5 and 6 show a flow chart of the process for calculating the vibration damping torque TRQIGDGBS. This process is executed by the CPU in the ECU 5 at predetermined crank angle intervals (for example, 30 degrees).

Figure 8:
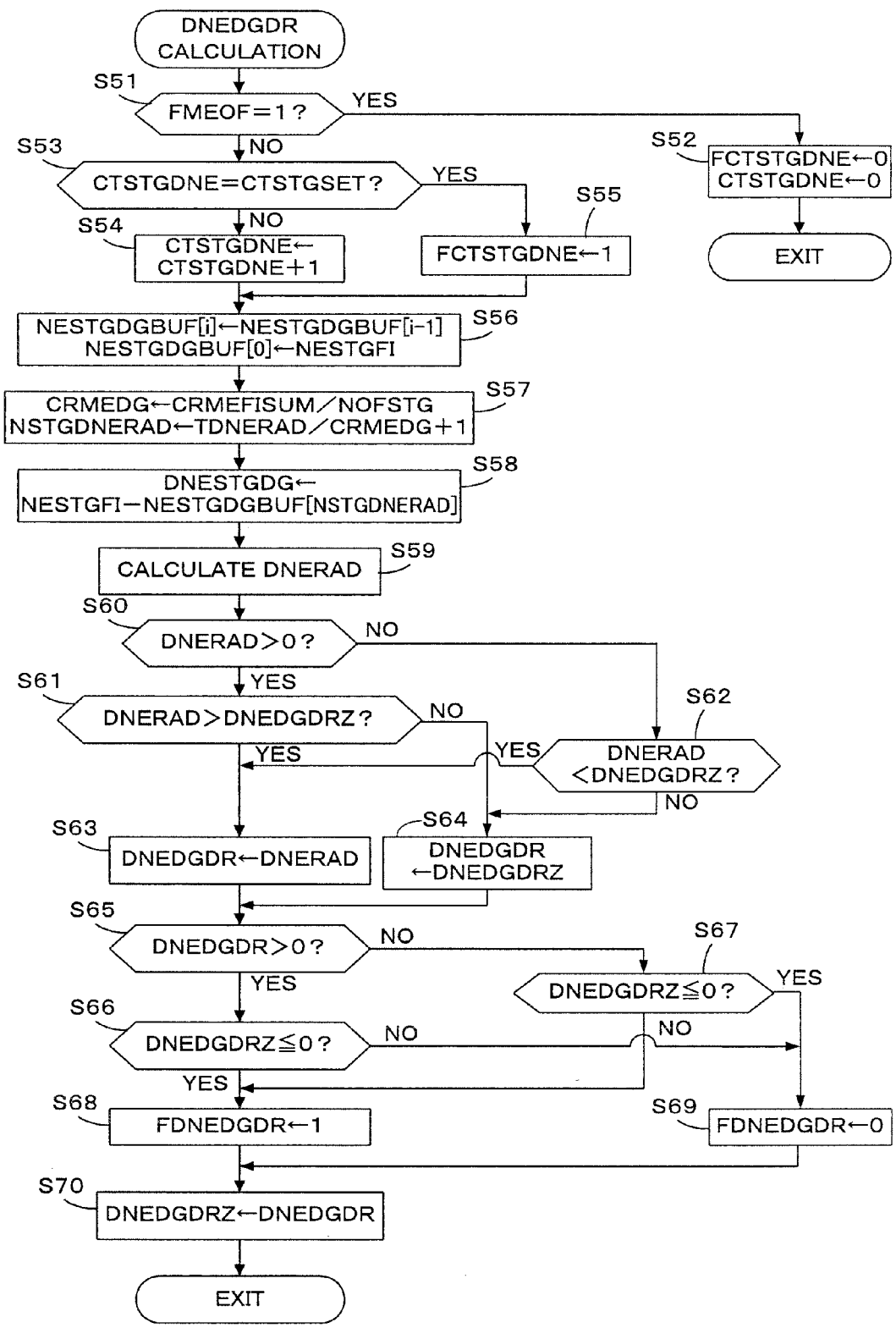
FIG. 8 is a flowchart of a process executed in the process of FIG. 5 for calculating an envelop parameter (DNEDGDR).
Figure 9:
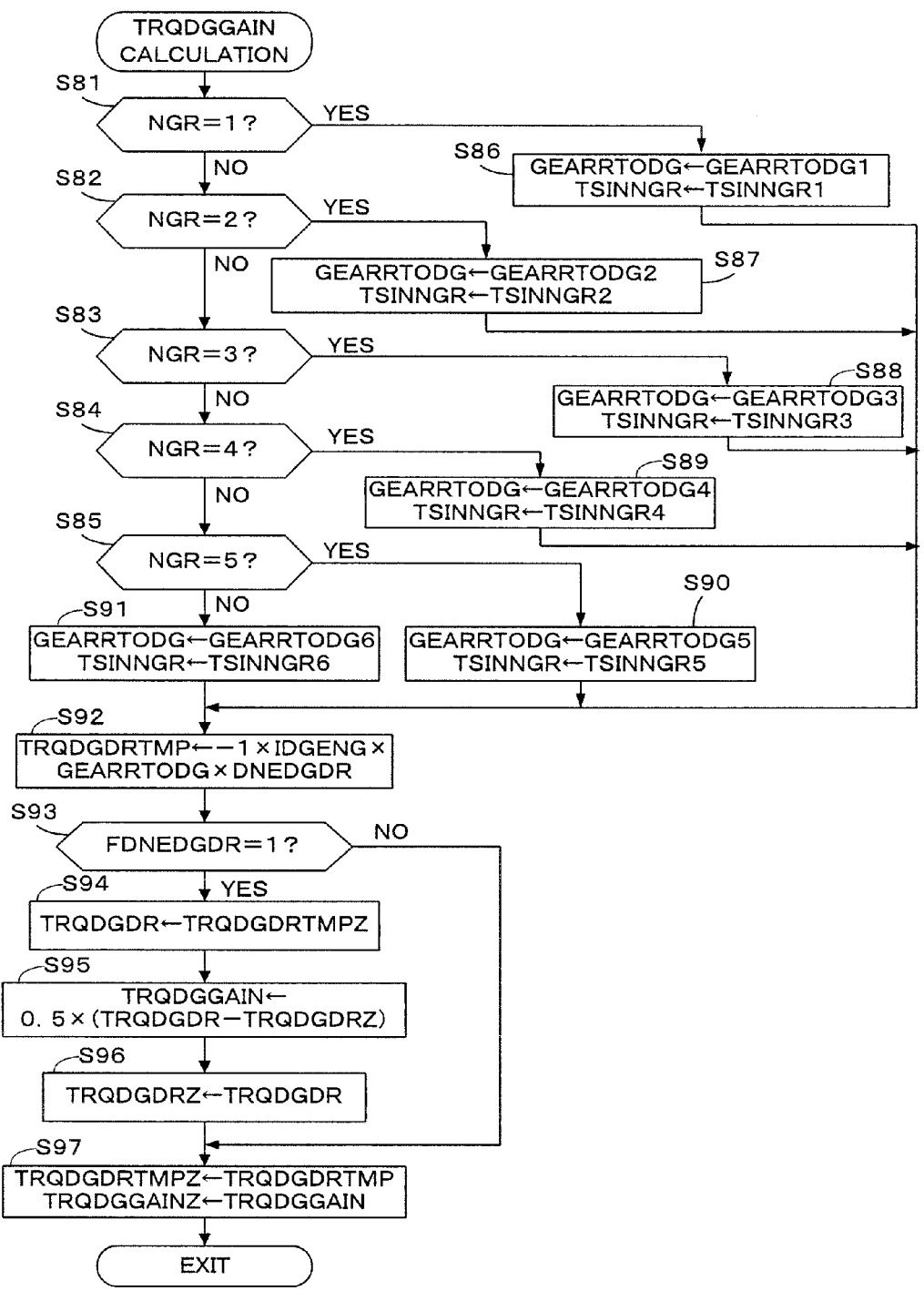
FIG. 9 is a flowchart of a process executed in the process of FIG. 5 for calculating a gain parameter (TRQDGGAIN).
Figure 10:
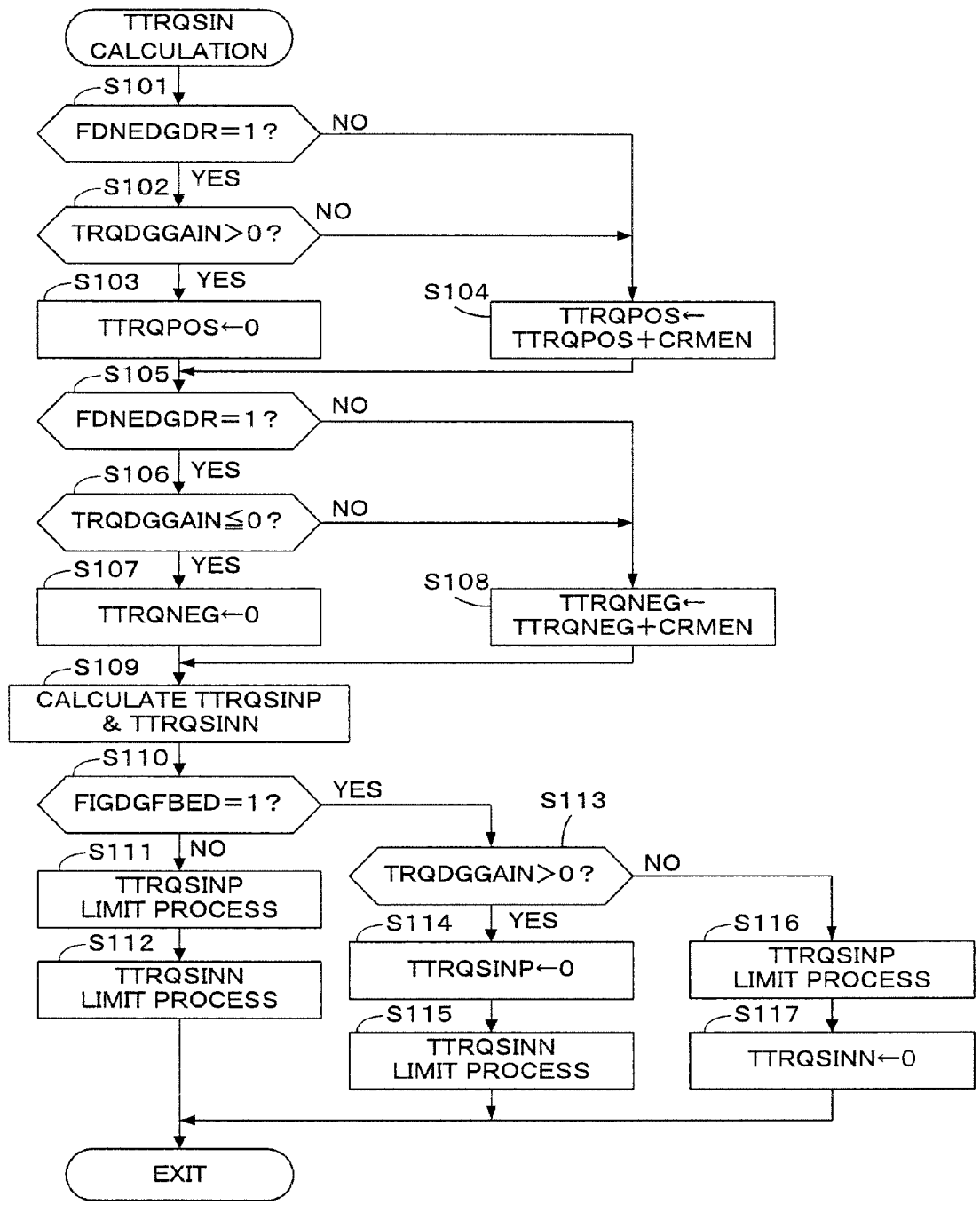
FIG. 10 is a flowchart of a process executed in the process of FIG. 5 for calculating a half-period time parameter (TTRQSINP, TTRQSINN).

In step S11, the DNEDGDR calculation process shown in FIG. 8 is executed to calculate the envelope parameter DNEDGDR. In step S12, the TRQDGGAIN calculation process shown in FIG. 9 is executed to calculate the gain parameter TRQDGGAIN and the half-resonance period TSINNGR. In step S13, the TTRQSIN calculation process shown in FIG. 10 is executed to calculate the half cycle time period parameters TTRQSINP and TTRQSINN which are applied to calculating the vibration torques TRQIGDGP and TRQIGDGN.

In step S14, the half-resonance period TSINNGR and the first half cycle time period parameter TTRQSINP are applied to the following equation (1) to calculate the first normalized time period parameter RTTQSNP.

$$RTTQSNP = TTRQSINP/TSINNGR \quad (1)$$

In step S15, it is determined whether or not the first normalized time period parameter RTTQSNP is less than "1". If the answer to step S15 is negative (NO), the first normalized time period parameter RTTQSNP is set to "1" (step S16), and the process proceeds to step S17. If the answer to step S15 is affirmative (YES), the process immediately proceeds to step S17.

Figure 7:
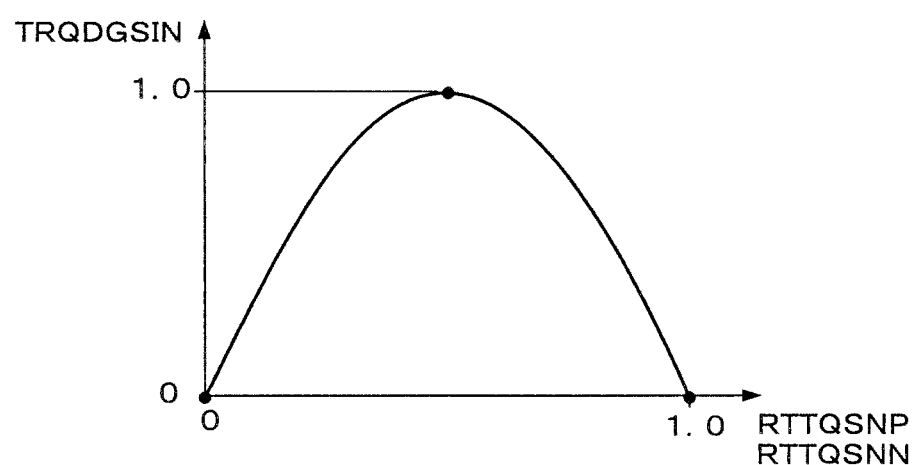
FIG. 7 shows a table which is referred to in the process of FIG. 5.

In step S17, a TRQDGSIN table shown in FIG. 7 is retrieved according to the first normalized time period parameter RTTQSNP to calculate a sinusoidal wave table value TRQDGSIN. In step S18, a first sinusoidal wave signal value TRQDGSINP is set to the sinusoidal wave table value TRQDGSIN. In step S19, it is determined whether or not the first sinusoidal wave signal value TRQDGSINP is greater than "0". If the answer to step S19 is affirmative (YES), it is further determined whether or not the preceding value TRQDGSINPZ of the first sinusoidal wave signal value TRQDGSINP is less than or equal to "0" (step S20). If the answer to step S19 or S20 is negative (NO), the process immediately proceeds to step S22.

If both of the answers to steps S19 and S20 are affirmative (YES), i.e., immediately after the first sinusoidal wave signal value TRQDGSINP has changed from "0" to a positive value, the first amplitude value TRQDGAINP is set to the gain parameter TRQDGGAIN calculated in step S12 (step S21). In step S22, the first sinusoidal wave signal value TRQDGSINP and the first amplitude value TRQDGAINP are applied to the following equation (2) to calculate the first vibration torque TRQIGDGP.

$$TRQIGDGP = TRQDGSINP \times TRQDGGAINP \quad (2)$$

In step S23, the preceding value TRQDGSINPZ of the first sinusoidal wave signal value is set to the present value TRQDGSINP.

In step S31 of FIG. 6, the half-resonance period TSINNGR and the second half cycle time period parameter TTRQSINN are applied to the following equation (3) to calculate the second normalized time period parameter RTTQSNN.

$$RTTQSNN = TTRQSINN/TSINNGR \quad (3)$$

In step S32, it is determined whether or not the second normalized time period parameter RTTQSNN is less than "1". If the answer to step S32 is negative (NO), the second normalized time period parameter RTTQSNN is set to "1" (step S33), and the process proceeds to step S34. If the answer to step S32 is affirmative (YES), the process immediately proceeds to step S34.

In step S34, the TRQDGSIN table shown in FIG. 7 is retrieved according to the second normalized time period parameter RTTQSNN to calculate the sinusoidal wave table value TRQDGSIN. In step S35, the second sinusoidal wave signal value TRQDGSINN is set to the sinusoidal wave table value TRQDGSIN. In step S36, it is determined whether or not the second sinusoidal wave signal value TRQDGSINN is greater than "0". If the answer to step S36 is affirmative (YES), it is further determined whether or not the preceding value TRQDGSINNZ of the second sinusoidal wave signal value TRQDGSINN is equal to or less than "0" (step S37). If the answer to step S36 or S37 is negative (NO), the process immediately proceeds to step S39.

If both of the answers to step S36 and S37 are affirmative (YES), i.e., immediately after the second sinusoidal wave signal value TRQDGSINN has changed from "0" to a positive value, the second amplitude value TRQDGGAINN is set to the gain parameter TRQDGGAIN calculated in step S12 (step S38). In step S39, the second sinusoidal wave signal value TRQDGSINN and the second amplitude value TRQDGAINN are applied to the following equation (4) to calculate the second vibration torque TRQIGDGN.

$$TRQIGDGN = TRQDGSINN \times TRQDGGAINN \quad (4)$$

In step S40, the preceding value TRQDGSINNZ of the second sinusoidal wave signal value is set to the present value TRQDGSINN. In step S41, the first and second vibration torques TRQIGDGP and TRQIGDGN are applied to the following equation (5) to calculate the vibration damping torque TRQIGDGBS.

$$TRQIGDGBS = -1.0 \times (TRQIGDGP + TRQIGDGN) \quad (5)$$

FIG. 8 is a flowchart of a DNEDGDR calculation process executed in step S11 of FIG. 5. The envelope parameter DNEDGDR is calculated in this process.

In step S51, it is determined whether or not an engine stop flag FMEOF is "1". The engine stop flag FMEOF is set to "1" when the engine is stopped. If the answer to step S51 is affirmative (YES), a data fetch completion flag FCTSTGDNE is set to "0" and the value of a data fetch counter CTSTGDNE is set to "0" (step S52). Thereafter, the process ends.

If the answer to step S51 is negative (NO), it is further determined whether or not the value of the data fetch counter CTSTGDNE is equal to a predetermined value CTSTGSET (for example, "80") (step S53). At first, the answer to step S53 is negative (NO) and the value of the data fetch counter CTSTGDNE is increased by "1" (step S54). If the value of the data fetch counter CTSTGDNE reaches the predetermined value CTSTGSET, the data fetch completion flag FCTSTGDNE is set to "1" (step S55). The data fetch completion flag FCTSTGDNE is referred to when performing a start determination of the vibration damping torque control in the process of FIG. 13 described later.

In step S56, a storing address i of the detected rotational speed data NESTGDGBUF[i] stored in the buffer memory is shifted by "1", the latest engine rotational speed data NESTGFI is stored in NESTGDGBUF[0]. The engine rotational speed data NESTGFI is calculated at intervals of 30 degrees of the crank angle.

In step S57, a stage period CRMEDG is calculated by the following equation (6), and the stage period CRMEDG is applied to the following equation (7) to calculate a calculation stage number NSTGDNERAD. In the equation (6), CRMEFISUM is a time period (the latest value) in which the crankshaft rotates "180" degrees, and NOFSTG is a number of stages (for example, "6") contained in a crank angle period of 180 degrees. In the equation (7), TDNERAD is a calculation period [ms] of the angular speed change rate DNERAD. It is to be noted that "1" is added in order to round up the value in the decimal place contained in the calculation result of (TDNERAD/CRMEDG).

$$CRMEDG = CRMEFISUM/NOFSTG \quad (6)$$

$$NSTGDNERAD = TDNERAD/CRMEDG + 1 \quad (7)$$

In step S58, the rotational speed change amount DNEST-GDG during the time period of the calculation period TDNERAD is calculated by the following equation (8).

$$DNESTGDG = NESTGFI - NESTGBUF[NSTGN-DERAD] \quad (8)$$

In step S59, the rotational speed change amount DNEST-GDG [rpm], the stage period CRMEDG, and the calculation period stage number NSTGDNERAD are applied to the following equation (9) to calculate the angular speed change rate DNERAD [rad/s$^2$]. KCV in the equation (9) is a conversion coefficient.

$$DNERAD = KCV \times DNESTGDG/(CRMEDG \times NSTGD-NERAD) \quad (9)$$

In step S60, it is determined whether or not the angular speed change rate DNERAD is greater than "0". If the answer to step S60 is affirmative (YES), it is further determined whether or not the angular speed change rate DNERAD is greater than the preceding value DNEDGDRZ of the envelope parameter (step S61). If the answer to step S61 is affirmative (YES), i.e., the angular speed change rate DNERAD is positive and increasing, the envelope parameter DNEDGDR is set to the present value of the angular speed change rate DNERAD (step S63). If the answer to step S61 is negative (NO), the envelope parameter DNEDGDR is maintained at the preceding value DNEDGDRZ (step S64).

If the answer to step S60 is negative (NO), i.e., DNERAD is equal to or less than "0", it is further determined whether or not the angular speed change rate DNERAD is less than the preceding value DNEDGDRZ of the envelope parameter (step S62). If the answer to step S62 is affirmative (YES), i.e., the angular speed change rate DNERAD is negative and decreasing, the process proceeds to step S63, in which the envelope parameter DNEDGDR is set to the present value of the angular speed change rate DNERAD. If the answer of step S62 is a negative (NO), the process proceeds to step S64, in which the envelope curve parameter DNEDGDR is maintained at the preceding value DNEDGDRZ.

In step S65, it is determined whether or not the envelope parameter DNEDGDR is greater than "0". If the answer to step S65 is affirmative (YES), it is further determined whether or not the preceding value DNEDGDRZ of the envelope parameter is equal to or less than "0" (step S66). If the answer to step S66 is affirmative (YES), i.e., the envelope parameter DNEDGDR has changed from a value equal to or less than "0" to a value greater than "0", an increase/decrease change flag FDNEDGDR is set to "1" (step S68). On the other hand, if the answer to step S66 is negative (NO), the increase/decrease change flag FDNEDGDR is set to "0" (step S69).

If the answer to step S65 is negative (NO), it is further determined whether or not the preceding value DNEDGDRZ of the envelope parameter is equal to or less than "0" (step S67). If the answer to step S67 is negative (NO), i.e., the envelope parameter DNEDGDR has changed from a value greater than "0" to a value equal to or less "0", the process proceeds to step S68, in which the increase/decrease change flag FDNEDGDR is set to "1". On the other hand, if the answer to step S67 is affirmative (YES), the process proceeds to step S69, in which the increase/decrease change flag FDNEDGDR is set to "0".

In step S70, the preceding value DNEDGDRZ of the envelope parameter is set to the present value DNEDGDR, and the process ends.

FIG. 9 is a flowchart of the TRQDGGAIN calculation process executed in step S12 of FIG. 5. In this process, the gain parameter TRQDGGAIN and the half-resonance period TSINNGR are calculated.

In this embodiment, the shift position NGR takes values from "1" (1st-speed) to "6" (6th-speed). Accordingly, it is determined in steps S81-S85 of FIG. 9 which value the shift position NGR is equal to.

When NGR is equal to "1", a gear ratio GEARRTODG is set to a 1st-speed gear ratio GEARRTODG1, and the half-resonance period TSINNGR is set to a half-resonance period TSINNGR1 corresponding to the 1st-speed (step S86). When NGR is equal to "2", the gear ratio GEARRTODG is set to a 2nd-speed gear ratio GEARRTODG2, and the half-resonance period TSINNGR is set to a half-resonance period TSINNGR2 corresponding to the 2nd-speed (step S87).

When NGR is equal to "3", the gear ratio GEARRTODG is set to a 3rd-speed gear ratio GEARRTODG3, and the half-resonance period TSINNGR is set to a half-resonance period TSINNGR3 corresponding to the 3rd-speed (step S88). When NGR is equal to "4", the gear ratio GEARRTODG is set to a 4th-speed gear ratio GEARRTODG4, and the half-resonance period TSINNGR is set to a half-resonance period TSINNGR4 corresponding to the 4th-speed (step S89).

When NGR is equal to "5", the gear ratio GEARRTODG is set to a 5th-speed gear ratio GEARRTODG5, and the half-resonance period TSINNGR is set to a half-resonance period TSINNGR5 corresponding to the 5th-speed (step S90). When NGR is equal to "6", the gear ratio GEARRTODG is set to a 6th-speed gear ratio GEARRTODG6, and the half-resonance period TSINNGR is set to a half-resonance period TSINNGR6 corresponding to the 6th-speed (step S91).

It is to be noted that the above parameters satisfy the following relationships:

GEARRTODG1>GEARRTODG2>GEARRTODG3>GEARRTODG4
>GEARRTODG5>GEARRTODG6
TSINNGR1>TSINNGR2>TSINNGR3>TSINNGR4>TSINNGR5
>TSINNGR6

In step S92, the gear ratio GEARRTODG and the envelope parameter DNEDGDR are applied to the following equation (10) to calculate a temporary vibration torque peak value TRQDGDRTMP. IDGENG in the equation (10) is an inertia moment of the vehicle power train.

$$TRQDGDRTMP = -1 \times IDGENG \times GEARRTODG \times DNEDGDR \quad (10)$$

In step S93, it is determined whether or not the increase/decrease change flag FDNEDGDR is "1". If the answer to step S93 is negative (NO), the process immediately proceeds to step S97. If the increase/decrease change flag FDNEDGDR is "1", the process proceeds to step S94, in which an vibration torque peak value TRQDGDR is set to a preceding value TRQDGDRTMPZ of the temporary vibration torque peak value. In step S95, the vibration torque peak value TRQDGDR and its preceding value TRQDGDRZ are applied to the following equation (11) to calculate the gain parameter TRQDGGAIN.

$$TRQDGGAIN = 0.5 \times (TRQDGDR - TRQDGDRZ) \quad (11)$$

In step S96, the preceding value TRQDGDRZ of the vibration torque peak value is set to the present value TRQDGDR. In step S97, the preceding value TRQDGDRT- MPZ of the temporary vibration torque peak value is set to the present value TRQDGDRTMP, and the preceding value TRQDGGAINZ of the gain parameter is set to the present value TRQDGGAIN.

According to the process of FIG. 9, the gain parameter TRQDGGAIN corresponding to the amplitude of the vibration damping torque is set to a value corresponding to half of the difference between the two preceding vibration torque peak values, i.e., the local maximum value and the local minimum value. By setting the gain parameter TRQDGGAIN as described above, the vibration damping torque TRQIGDGBS is calculated so that the angular speed change rate DNERAD coincides with the center value of the local maximum value and the local minimum value.

FIG. 10 is a flowchart of the TTRQSIN calculation process executed in step S13 of FIG. 5. In this process, the half cycle time period parameters TTRQSINP and TTRQSINN applied to calculating the vibration torques TRQIGDGP and TRQIGDGN, are calculated.

In step S101, it is determined whether or not the increase/decrease change flag FDNEDGDR is "1". If the answer to step S101 is affirmative (YES), it is further determined whether or not the gain parameter TRQDGGAIN is greater than "0" (step S102). If the answer to step S102 is affirmative (YES), i.e., the plus/minus sign of the envelope parameter DNEDGDR has changed and the gain parameter TRQDGGAIN is greater than "0", the first basic time period parameter TTRQPOS is set to "0" (step S103).

If the answer to step S101 or S102 is negative (NO), the first basic time period parameter TTRQPOS is increased by a rotation time period CRMEN (the latest value) with the following equation (12) (step S104). The rotation time period CRMEN is obtained by converting the execution interval (30 degrees of the crank angle) of this process into a time period [ms].

$$TTRQPOS=TTRQPOS+CRMEN \quad (12)$$

In step S105, it is determined whether or not the increase/decrease change flag FDNEDGDR is "1". If the answer to step S105 is affirmative (YES), it is further determined whether or not the gain parameter TRQDGGAIN is equal to or less than "0" (step S106). If the answer to step S106 is affirmative (YES), i.e., the plus/minus sign of the envelope parameter DNEDGDR has changed and the gain parameter TRQDGGAIN is equal to or less than "0", the second basic time period parameter TTRQNEG is set to "0" (step S107).

If the answer to step S105 or S106 is negative (NO), the second basic time period parameter TTRQNEG is increased by the rotation time period CRMEN with the following equation (13) (step S108).

$$TTRQNEG=TTRQNEG+CRMEN \quad (13)$$

In step S109, the first basic time period parameter TTRQPOS and the second basic time period parameter TTRQNEG are respectively applied to the following equations (14) and (15) to calculate the first half cycle time period parameter TTRQSINP and the second half cycle time period parameter TTRQSINN. In the following equations (14) and (15), CRMEFISUM is a time period (the latest value) during which the crankshaft rotates 180 degrees, NTDCIGDG is a dead stroke number (for example, "1") corresponding to the time period from the time of correcting the ignition timing to the time the engine output torque actually changes, and TDNERADDLY is a time period (for example, 30 ms) necessary for calculating the angular speed change rate DRERAD.

$$TTRQSINP=TTRQPOS-(TSINNGR/2-CRMEFISUM \times NTDCIGDG)+DNERADDLY \quad (14)$$

$$TTRQSINN=TTRQNEG-(TSINNGR/2-CRMEFISUM \times NTDCIGDG)+TDNERADDLY \quad (15)$$

In step S110, it is determined whether or not a transient control flag FIGDGFBED is "1". The transient control flag FIGDGFBED is set to "1" in the transient state for ending the vibration damping torque control in the process of FIG. 13 (FIGDGCNT setting process) described later. If the answer to step S110 is negative (NO), i.e., when performing the normal control, the limit process of the first and second half cycle time period parameters TTRQSINP and TTRQSINN calculated in step S109, is performed (steps S111 and S112). That is, the limit process is performed so that both of the first and the second half cycle time period parameters TTRQSINP and TTRQSINN take a value which is equal to or greater than "0" and equal to or less the half-resonance period TSINNGR.

If the answer to step S110 is affirmative (YES), i.e., when performing the transient control, it is determined whether or not the gain parameter TRQDGGAIN is greater than "0" (step S113). If the answer to step S113 is affirmative (YES), the first half cycle time period parameter TTRQSINP is set to "0" (step S114), and the limit process similar to that of step S112 is performed with respect to the second half cycle time period parameter TTRQSINN (step S115). On the other hand, if the answer to step S113 is negative (NO), the limit process similar to that of step S111 is performed with respect to the first half cycle time period parameter TTRQSINP (step S116), and the second half cycle time period parameter TTRQSINN is set to "0" (step S117).

Figure 11:
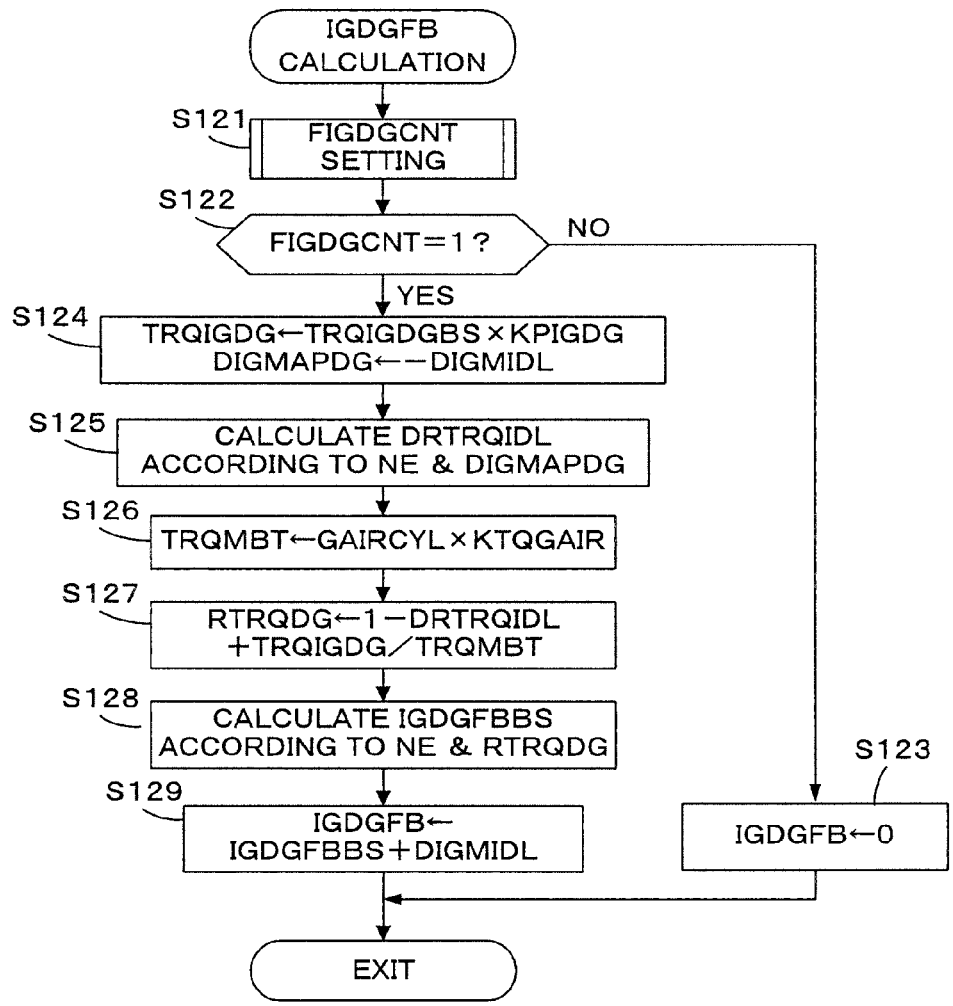
FIG. 11 is a flowchart of a process for calculating a modified ignition timing correction amount (IGDGFB) including a vibration damping retard correction amount.

FIG. 11 is a flowchart of a process which calculates a correction amount IGDGFB of the ignition timing (IGDGFB will be hereinafter referred to as "modified ignition timing correction amount") for generating the vibration damping torque TRQIGDGBS. This process is executed by the CPU in the ECU 5 in synchronism with generation of the TDC pulse.

Figure 13:
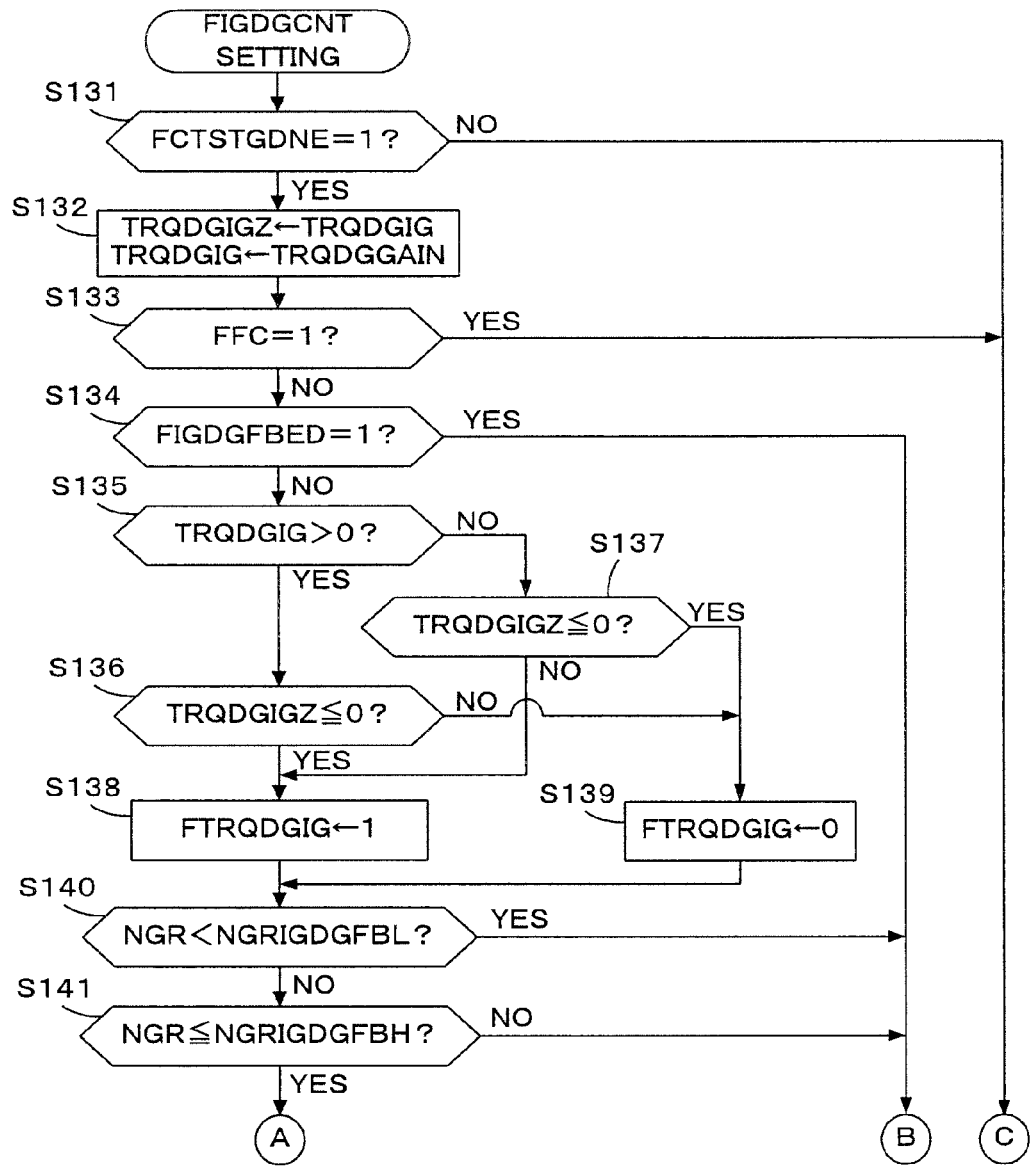
FIG. 13 is a flowchart of a process executed in the process of FIG. 11 for setting a control execution flag (FIGDGCNT).

In step S121, the process shown in FIG. 13 is executed to set a control execution flag FIGDGCNT to "1" if the vibration damping torque control execution condition is satisfied. In step S122, it is determined whether or not the control execution flag FIGDGCNT is "1". If the answer to step S122 is negative (NO), i.e., the vibration damping torque control execution condition is not satisfied, the modified ignition timing correction amount IGDGFB is set to "0" (step S123), and the process ends.

The answer to step S122 is affirmative (YES), i.e., if the vibration damping torque control execution condition is satisfied, the vibration damping torque TRQIGDGBS is applied to the following equation (21), to calculate a modified vibration damping torque TRQIGDG, and a present retard correction amount DIGMAPDG is set to a value which is obtained by inverting the plus/minus sign of a present ignition timing correction amount DIGMIL (step S124). In the equation (21), KPIGDG is a predetermined coefficient which is set, for example, to "0.1". The present ignition timing correction amount DIGMIL is a correction amount corresponding to a difference (=IGMBT−IGLOGB) between a reference ignition timing IGLOGB and the optimal ignition timing IGMBT in a condition (reference condition) where the vibration damping torque control is not performed. The present ignition timing correction amount DIGMIL takes a value equal to or greater than "0".

$$TRQIGDG=TRQIGDGBS \times KPIGDG \quad (21)$$

Figure 12:
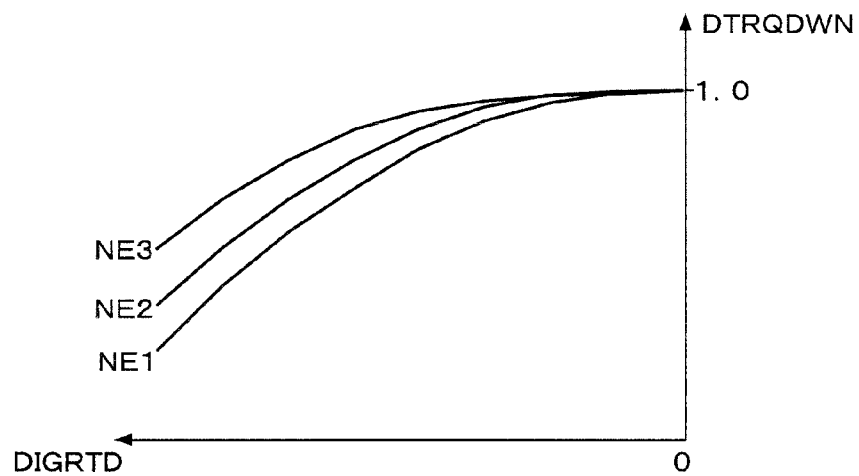
FIG. 12 shows a torque reduction ratio map which is referred to in the process of FIG. 11.

In step S125, a torque reduction ratio map shown in FIG. 12 is retrieved according to the engine rotational speed NE and the present retard correction amount DIGMAPDG, to calculate a present torque reduction ratio DRTRQIDL. The torque reduction ratio map is a map on which the relationship between a torque reduction ratio DTRQDWN and an ignition timing retard amount IGRTD under the condition where the engine rotational speed NE is fixed. The torque reduction ratio DTRQDWN indicates a reduction ratio with respect to an output torque TRQMBT obtained by setting the ignition timing to the optimal ignition timing IGMBT. TRQMBT is hereinafter referred to as "reference output torque". NE1-NE3 shown in FIG. 12 are predetermined rotational speeds. Interpolation calculation is used for calculating the present torque reduction DRTRQIDL if necessary. It is to be noted that the setting curves are shown in FIG. 12 as a typical example, and a required number of curves are actually set according to the engine characteristic.

In step S126, the reference output torque TRQMBT is calculated with the following equation (22). GAIRCYL in the equation (22) is a cylinder intake air amount, which is calculated according to the detected intake air flow rate GAIR. It is confirmed that the reference output torque TRQMBT is substantially proportional to the cylinder intake air amount GAIRCYL, and KTQGAIR is a conversion coefficient for converting the intake air amount [g] to torque [Nm].

$$TRQMBT = GAIRCYL \times KTQGAIR \quad (22)$$

In step S127, the modified vibration damping torque TRQIGDG, the present torque reduction ratio DRTRQIDL, and the reference output torque TRQMBT are applied to the following equation (23), to calculate a required torque reduction ratio RTRQDG.

$$RTRQDG = 1 - DRTRQIDL + TRQIGDG/TRQMBT \quad (23)$$

In step S128, the torque reduction ratio map shown in FIG. 12 is reversely retrieved according to the engine rotational speed NE and the required torque reduction ratio RTRQDG, to calculate a vibration damping retard correction amount IGDGFBBS.

In step S129, the modified ignition timing correction amount IGDGFB is calculated by adding the vibration damping retard correction amount IGDGFBBS and the present ignition timing correction amount DIGMIL.

The ignition timing IGLOG is finally calculated by adding the modified ignition timing correction amount IGDGFB to the reference ignition timing IGLOGB.

Figure 14:
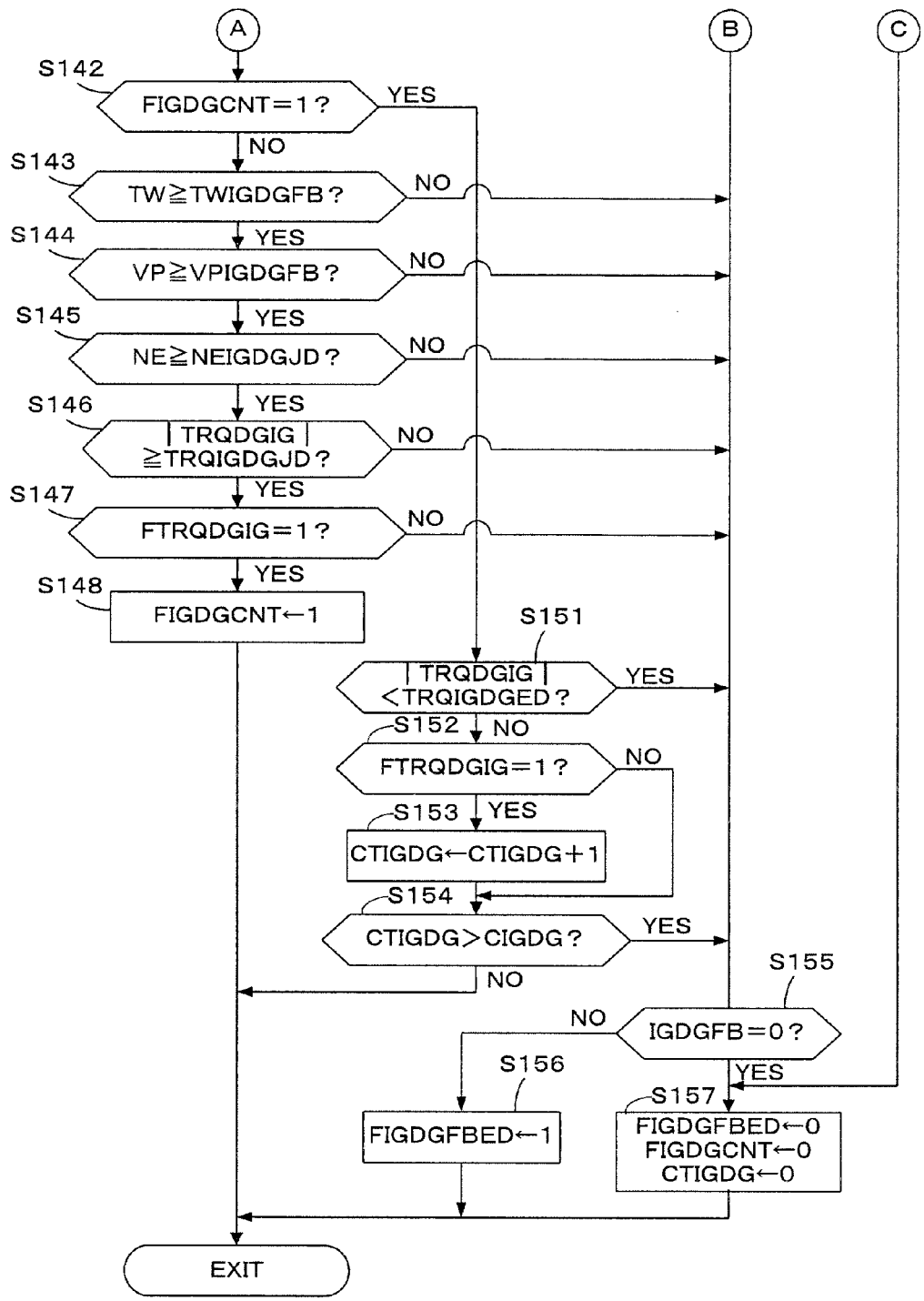
FIG. 14 is a flowchart of the process executed in the process of FIG. 11 for setting the control execution flag (FIGDGCNT).

FIGS. 13 and 14 are flowcharts of the FIGDGCNT setting process executed in step S121 of FIG. 11.

In step S131, it is determined whether or not the data fetch completion flag FCTSTGDNE set in the process of FIG. 8 is "1". If the answer to step S131 is negative (NO), it is determined that the vibration damping torque control execution condition is not satisfied, and the process proceeds to step S157 (FIG. 14), in which both the transient control flag FIGDGFBED and the control execution flag FIGDGCNT are set to "0" and the value of a control execution counter CTIGDG is set to "0". The control execution counter CTIGDG counts up the number of times that the plus/minus sign of the gain parameter TRQDGGAIN of the vibration damping torque is inverted.

If the answer to step S131 is affirmative (YES), the preceding value TRQDGIGZ of the gain parameter TRQDGIG is set to the present value TRQDGIG, and the present value TRQDGIG is set to the gain parameter TRQDGGAIN calculated in the process of FIG. 8 (step S132). In step S133, it is determined whether or not a fuel cut flag FFC is "1". The fuel cut flag is set to "1" when the fuel cut operation in which fuel supply to the engine is temporarily stopped is performed. If the answer to step S133 is affirmative (YES), it is determined that the execution condition is not satisfied, and the process proceeds to step S157.

If the answer to step S133 is negative (NO), it is determined whether or not the transient control flag FIGDGFBED is "1" (step S134). At first, the answer to step S133 is negative (NO). Accordingly, the process proceeds to step S135, in which it determined whether or not the gain parameter TRQDGIG is greater than "0". If the answer to step S135 is affirmative (YES), it is further determined whether or not the preceding value TRQDGIGZ of the gain parameter is equal to or less than "0" (step S136). If the answer to step S136 is affirmative (YES), i.e., immediately after the gain parameter TRQDGIG has changed from a value equal to or less than "0" to a value greater "0", a gain change flag FTRQDGIG is set to "1" (step S138). If the answer to step S136 is negative (NO), i.e., the plus/minus sign of the gain parameter TRQDGIG has not changed, the gain change flag FTRQDGIG is set to "0" (step S139).

If the answer to step S135 is negative (NO), the process proceeds to step S137, in which the same determination as step S136 is performed. If the answer to step S137 is negative (NO), i.e., immediately after the gain parameter TRQDGIG has changed from a value greater than "0" to a value equal to or less than "0", the process proceeds to step S138, in which the gain change flag FTRQDGIG is set to "1". If the answer to step S137 is affirmative (YES), i.e., the plus/minus sign of the gain parameter TRQDGIG has not changed, the process proceeds to step S139, in which the gain change flag FTRQDGIG is set to "0".

In step S140, it is determined whether or not the shift position NGR is lower than a predetermined low shift position NGRIGDGFBL (for example, 2nd). If the answer to step S140 is negative (NO), it is determined whether or not the shift position NGR is equal to or lower than a predetermined high shift position NGRIGDGFBH (for example, 4th) (step S141).

If the answer to step S140 is affirmative (YES) or the answer to step S141 is negative (NO), i.e., the shift position NGR is outside the predetermined range, the process proceeds to step S155, in which it is determined whether or not the vibration damping retard correction amount IGDGFBBS "0". If the vibration damping torque control is not started, the answer to step S155 is affirmative (YES). Accordingly, the process proceeds to step S157. If the answer to step S155 is negative (NO), the transient control flag FIGDGFBED is set to "1" (step S156).

If the answer to step S141 is affirmative (YES), it is determined whether or not the control execution flag FIGDGCNT has already been set to "1" (step S142). Since the answer to step S142 is negative (NO) at first, the process proceeds to step S143, in which it is determined whether or not the coolant temperature TW is equal to or higher than a predetermined coolant temperature TWIGDGFB (for example, 0 degree Centigrade). If the answer to step S143 is affirmative (YES), it is determined whether or not the vehicle speed VP is equal to or higher than a predetermined vehicle speed VPIGDGFB (for example, 10 km/h) (step S144). If the answer to step S144 is affirmative (YES), it is determined whether or not the engine rotational speed NE is equal to or higher than a predetermined rotational speed NEIGDGJD (for example, 1000 rpm) (step S145). If the answer to step S145 is affirmative (YES), it is determined whether or not the absolute value of the gain parameter TRQDGIG is equal to or greater than a predetermined start determination threshold value TRQIGDGJD (step S146). If the answer to step S146 is affirmative (YES), it is further determined whether or not the gain change flag FTRQDGIG is "1" (step S147).

If any one of the answers to steps S143-S147 is negative (NO), it is determined that the execution condition is not satisfied, and the process proceeds to step S155. On the other hand, if the answer to step S147 is affirmative (YES), the execution condition of the vibration damping torque control is determined to be satisfied, and the control execution flag FIGDGCNT is set to "1" (step S148).

After the control execution flag FIGDGCNT is set to "1", the answer to step S142 becomes affirmative (YES) and the process proceeds to step S151, in which it is determined whether or not the absolute value of the gain parameter TRQDGIG is less than a predetermined end determination threshold value TRQIGDGED (<TRQIGDGJD). If the answer to step S151 is affirmative (YES), the process proceeds to step S155.

If the answer to step S151 is negative (NO), it is determined whether or not the gain change flag FTRQDGIG is "1" (step S152). If the answer to step S152 is affirmative (YES), the value of the control execution counter CTIGDG is incremented by "1" (step S153), and the process proceeds to step S154. If the answer to step S152 is negative (NO), the process immediately proceeds to step S154.

In step S154, it is determined whether or not the value of the control execution counter CTIGDG is greater than a predetermined threshold value CIGDG (for example, 3). While the answer to step S154 is negative (NO), the process immediately ends. If the answer to step S154 thereafter becomes affirmative (YES), the process proceeds to step S155.

According to the process of FIGS. 13 and 14, the vibration damping torque control is started from the time the plus/minus sign of the gain parameter TRQDGIG changes in the state where the absolute value of the gain parameter TRQDGIG is equal to or greater than the predetermined start determination threshold value TRQIGDGJD. The transient control is started when the absolute value of the gain parameter TRQDGIG becomes less than the predetermined end determination threshold value TRQIGDGED, or when the value of the control execution counter CTIGDG exceeds the predetermined threshold value CIGDG. The vibration damping torque control ends when the vibration damping retard correction amount IGDGFBBS becomes "0".

Figure 15:
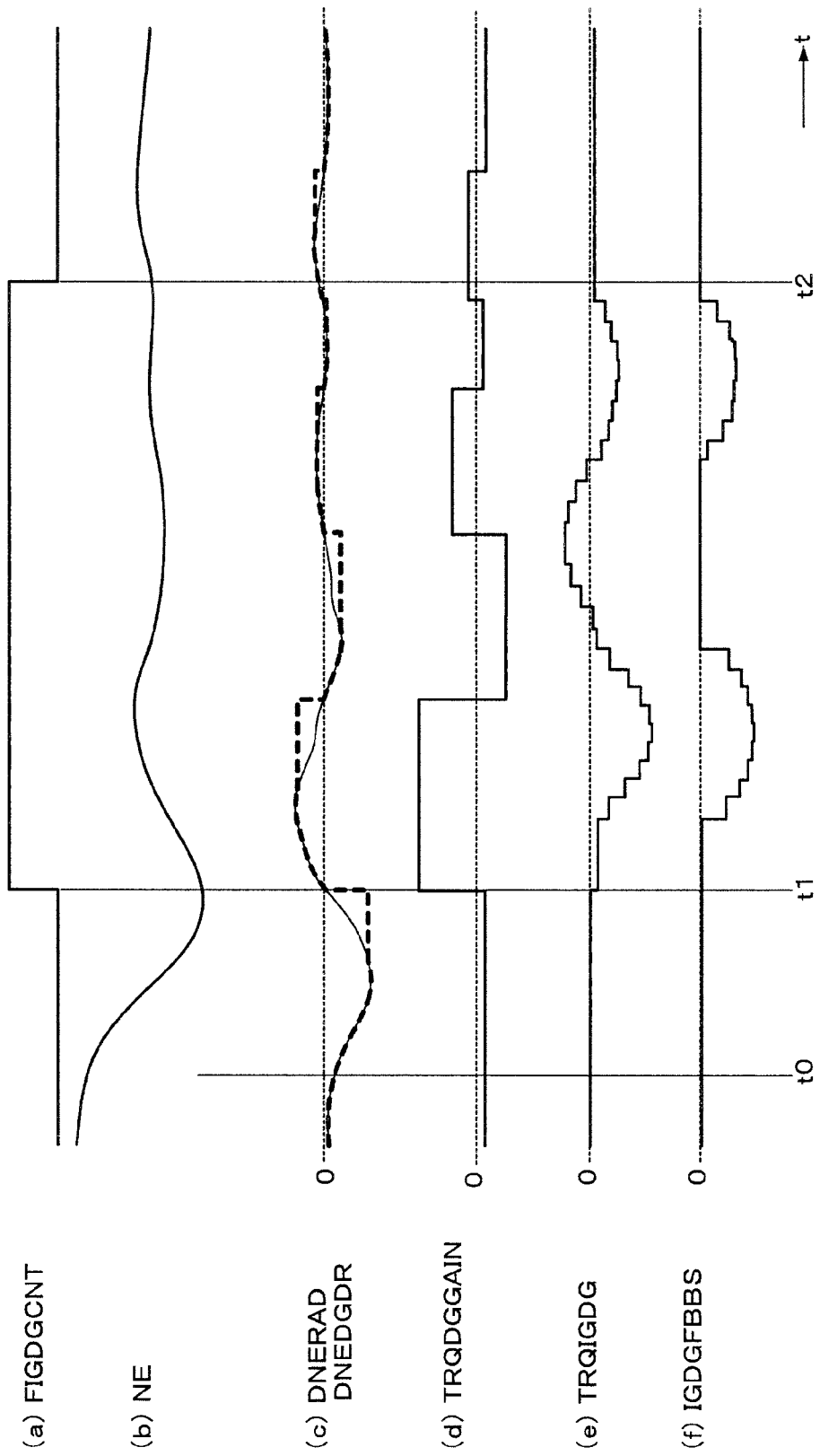
FIG. 15 is a time chart illustrating an example of the vibration damping torque control operation.

FIG. 15 is a time chart for explaining the vibration damping torque control described above, and shows changes in the control execution flag FIGDGCNT, the engine rotational speed NE, the angular speed change rate DNERAD (and the envelope parameter DNEDGDR), the gain parameter TRQDGGAIN, the modified vibration damping torque TRQIGDG, and the vibration damping retard correction amount IGDGFBBS.

FIG. 15 shows an example in which an upshift is performed at time t0, the control execution condition is satisfied and the vibration damping torque control starts at time t1, and ends at time t2. The gain parameter TRQDGGAIN calculated according to the envelope parameter DNEDGDR abruptly changes at time t1, and the vibration damping torque control is started. It is confirmed that the torque change is rapidly suppressed by performing the vibration damping torque control.

As described above, in this embodiment, the angular speed change rate DNERAD corresponding to an amount of change in the engine rotational speed NE, and the vibration damping torque TRQIGDGBS is calculated so that the angular speed change rate DNERAD coincides with the center value of the local minimum value and the local maximum value. Further, the vibration damping retard correction amount IGDGFBBS is calculated according to the vibration damping torque TRQIGDGBS, and the ignition timing IGLOG is corrected with the vibration damping retard correction amount IGDGFBBS. The center value of the angular speed change rate DNERAD corresponds to the acceleration component indicative of the vehicle driver's demand. Accordingly, performing the torque correction using the center value of the angular speed change rate DNERAD as a target value, makes it possible to maintain the engine output that the driver demands and to suppress unpleasant vibrations.

Further, the half resonance period TSINNGR corresponding to half of the resonance period of the vehicle power train is calculated according to the shift position NGR, and the timing correction time period TCR is calculated by subtracting the control delay time period TCDLY from the time period (=TSINNGR/2) equal to one fourth of the resonance period. Further, the vibration damping retard correction amount IGDGFBBS is controlled to change with a delay of the timing correction time period TCR from the time of change in the angular speed change rate DNERAD. The phase of resonance vibration of the vehicle power train is delayed by about 90 degrees (¼ period) from the phase of change in the angular speed change rate DNERAD. Accordingly, the resonance vibration can effectively be suppressed by changing the vibration damping retard correction amount IGDGFBBS with the above-described phase. It is to be noted that, in this embodiment, the timing correction time period TCR is given by the following equation (31) (refer to the equation (14) or (15)), and the control delay time period TCDLY is shown by the following equation (32).

$$TCR = TSINNGR/2 - (CRMEFISUM \times NTDCIGDG + TDNERADDLY) \quad (31)$$

$$TCDLY = CRMEFISUM \times NTDCIGDG + TDNERADDLY \quad (32)$$

Further, the gain parameter TRQDGGAIN is calculated according to the torque value corresponding to half of the difference (TRQDGDR-TRQDGDRZ) of the local maximum and the local minimum of the vibration torque (equation (11)), and the sinusoidal wave signal values TRQDGSINP and TRQDGSINN corresponding to the sinusoidal wave signal which changes with the resonance period of the vehicle power train are calculated. The vibration torques TRQIGDGP and TRQIGDGN are calculated using the sinusoidal wave signal values TRQDGSINP and TRQDGSINN and the gain parameter TRQDGGAIN, and the vibration damping torque TRQIGDGBS is calculated by adding the vibration torques TRQIGDGP and TRQIGDGN and reversing the phase (plus/minus sign) thereof. Furthermore, the vibration damping retard correction amount IGDGFBBS is calculated according to the vibration damping torque TRQIGDGBS. This makes it possible to generate an engine output torque for damping the vibration torque with appropriate amplitude and phase, thereby effectively suppressing the resonance vibration.

Further, the basic time period parameters TTRQPOS and TTRQNEG which are reset at the time the plus/minus sign of the angular speed change rate DNERAD changes, are calculated, and the sinusoidal wave signal values TRQDGSINP and TRQDGSINN are calculated using the normalized time period parameters RTTQSNP and RTTQSNN which change in the phase delayed with the timing correction time period TCR from the basic time period parameters TTRQPOS and TTRQNEG. That is, the sinusoidal wave signal values TRQDGSINP and TRQDGSINN are modified to "0" at the time the timing correction time period TCR has elapsed from the time of change in the plus/minus sign of the angular speed change rate DNERAD. The resonance period may sometimes take a value which slightly deviates from the designed center value, due to differences in the vehicle characteristic or due to aging. Modifying the "0" crossing timing of the sinusoidal wave signal values TRQDGSINP and TRQDGSINN applied to calculating the vibration damping torque TRQIGDGBS, reduces influence of the deviation in the resonance period, which makes it possible to maintain good vibration damping effect.

In this embodiment, the crank angle position sensor 11 corresponds to the rotational speed detecting means, and the ECU 5 constitutes the rotational speed change amount calculating means, the torque control amount correcting means, the torque correction amount calculating means, the resonance period calculating means, the amplitude calculating means, and the sinusoidal wave signal value calculating means. Specifically, steps S56-S59 of FIG. 8 correspond to the rotational speed change amount calculating means, steps S60-S70 of FIG. 8 and the process of FIGS. 9-11 correspond to the torque correction amount calculating means, steps S81-S91 of FIG. 9 correspond to the resonance period calculating means, steps S92-S97 of FIG. 9 correspond to the amplitude calculating means, and the process of FIG. 10 corresponds to the sinusoidal wave signal value calculating means.

The present invention is not limited to the embodiment described above, and various modifications may be made. For example, in the above described embodiment, the gain parameter TRQDGGAIN corresponding to the amplitude of the vibration damping torque TRQIGDGBS is set to positive and negative values, and both of the sinusoidal wave signal values TRQDGSINP and TRQDGSINN are set so as to correspond to the positive half cycle of the sinusoidal wave. Alternatively, the gain parameter TRQDGGAIN may always be set to a positive value, and the second sinusoidal wave signal value TRQDGSINN may be set so as to correspond to a value of the negative half cycle of the sinusoidal wave.

Further, in the above described embodiment, the vibration damping torque TRQIGDGBS is generated by correcting the ignition timing. When controlling a diesel engine, it is desired to correct a fuel injection amount to generate the vibration damping torque TRQIGDGBS.

Further, the present invention is also applicable to controlling a watercraft propulsion engine such as an outboard engine having a vertically extending crankshaft. Description of reference numerals 1 Internal combustion engine
5 Electronic control unit (rotational speed change amount calculating means, torque control amount correcting means, torque correction amount calculating means, resonance period calculating means, amplitude calculating means, sinusoidal wave signal value calculating means)
11 Crank angle position sensor (rotational speed detecting means)
15 Spark plug
33 Shift position sensor

The invention claimed is:

1. A control system for an internal combustion engine for driving a vehicle, which controls an output torque of said engine, comprising:

engine rotational speed detecting means for detecting a rotational speed of said engine;
rotational speed change amount calculating means for calculating a change amount of the engine rotational speed, the change amount being a parameter corresponding to a first-order derivative value of the engine rotational speed; and
torque control amount correcting means for correcting an output torque control amount of said engine so that the rotational speed change amount coincides with a center value of a local minimum value and a local maximum value of the rotational speed change amount,
wherein said torque control amount correcting means includes torque correction amount calculating means for calculating a torque correction amount according to a torque value which is equal to half of a difference between peak vibration torque values corresponding to the local minimum value and the local maximum value of the rotational speed change amount, and corrects the output torque control amount with the torque correction amount.

2. The control system according to claim 1, wherein said torque correction amount calculating means includes resonance period calculating means for calculating a resonance period of a power train of said vehicle, and changes the torque correction amount with a delay of a timing correction time period given by the following equation:

Timing correction time period=$TRSN/4-TCDLY$ where TRSN is the resonance period, and TCDLY is a delay time period from the time of changing the output torque control amount to the time the output torque actually changes.

3. The control system according to claim 2, wherein said torque correction amount calculating means includes:
amplitude calculating means for calculating an amplitude of the torque correction amount according to a difference of the peak vibration torques; and
sinusoidal wave signal value calculating means for calculating a sinusoidal wave signal value which periodically changes with the resonance period,
wherein said torque correction amount calculating means calculates the torque correction amount using the sinusoidal wave signal value and the amplitude.

4. The control system according to claim 3, wherein said sinusoidal wave signal value calculating means includes period modifying means for modifying the sinusoidal wave signal value to "0" at the time the timing correction time period has elapsed from the time the plus/minus sign of the rotational speed change amount changes.

5. A control method for an internal combustion engine for driving a vehicle, which controls an output torque of said engine, the control method comprising the steps of:
a) detecting a rotational speed of said engine;
b) calculating a change amount of the engine rotational speed, the change amount being a parameter corresponding to a first-order derivative value of the engine rotational speed; and
c) correcting an output torque control amount of said engine so that the rotational speed change amount coincides with a center value of a local minimum value and a local maximum value of the rotational speed change amount,
wherein said step c) includes the step of d) calculating a torque correction amount according to a torque value which is equal to half of a difference between peak vibration torque values corresponding to the local minimum value and the local maximum value of the rotational speed change amount, and the output torque control amount is corrected with the torque correction amount.

6. The control method according to claim 5, wherein said step d) includes the step of e) calculating a resonance period of a power train of said vehicle, and the torque correction amount is changed with a delay of a timing correction time period given by the following equation:

Timing correction time period=$TRSN/4-TCDLY$ where TRSN is the resonance period, and TCDLY is a delay time period from the time of changing the output torque control amount to the time the output torque actually changes.

7. The control method according to claim 6, wherein said step c) includes the steps of:
f) calculating an amplitude of the torque correction amount according to a difference of the peak vibration torques; and
g) calculating a sinusoidal wave signal value which periodically changes with the resonance period,
wherein the torque correction amount is calculated using the sinusoidal wave signal value and the amplitude.

8. The control method according to claim 7, wherein said step g) includes the step of modifying the sinusoidal wave signal value to "0" at the time the timing correction time period has elapsed from the time the plus/minus sign of the rotational speed change amount changes.

9. A computer program embodied on a computer-readable storage medium for causing a computer to implement a control method for an internal combustion engine for driving a vehicle, which controls an output torque of said engine, the control method comprising the steps of:
a) detecting a rotational speed of said engine;
b) calculating a change amount of the engine rotational speed, the change amount being a parameter corresponding to a first-order derivative value of the engine rotational speed; and
c) correcting an output torque control amount of said engine so that the rotational speed change amount coincides with a center value of a local minimum value and a local maximum value of the rotational speed change amount,
wherein said step c) includes the step of d) calculating a torque correction amount according to a torque value which is equal to half of a difference between peak vibration torque values corresponding to the local minimum value and the local maximum value of the rotational speed change amount, and the output torque control amount is corrected with the torque correction amount.

10. The computer program according to claim 9, wherein said step d) includes the step of e) calculating a resonance period of a power train of said vehicle, and the torque correction amount is changed with a delay of a timing correction time period given by the following equation:

Timing correction time period=$TRSN/4-TCDLY$ where TRSN is the resonance period, and TCDLY is a delay time period from the time of changing the output torque control amount to the time the output torque actually changes.

11. The computer program according to claim 10, wherein said step c) includes the steps of:
f) calculating an amplitude of the torque correction amount according to a difference of the peak vibration torques; and
g) calculating a sinusoidal wave signal value which periodically changes with the resonance period,
wherein the torque correction amount is calculated using the sinusoidal wave signal value and the amplitude.

12. The computer program according to claim 11, wherein said step g) includes the step of modifying the sinusoidal wave signal value to "0" at the time the timing correction time period has elapsed from the time the plus/minus sign of the rotational speed change amount changes.

* * * * *